US012789022B2

(12) United States Patent
Turiello

(10) Patent No.: US 12,789,022 B2
(45) Date of Patent: Nov. 10, 2026

(54) METHOD AND SYSTEM OF AIR/ENVIRONMENTAL PARAMETER BASED AUTOMATIC CLOSING OF ONE OR MORE VALVES TO ISOLATE BREATHABLE AIR SUPPLIED TO ONE OR MORE LEVELS OF A STRUCTURE HAVING A FIREFIGHTER AIR REPLENISHMENT SYSTEM IMPLEMENTED THEREIN

(71) Applicant: RESCUE AIR SYSTEMS, INC., San Carlos, CA (US)

(72) Inventor: Anthony J. Turiello, Westlake, TX (US)

(73) Assignee: Rescue Air Systems, Inc., San Carlos, CA (US)

( * ) Notice: Subject to any disclaimer, the term of this patent is extended or adjusted under 35 U.S.C. 154(b) by 600 days.

(21) Appl. No.: 18/211,594

(22) Filed: Jun. 20, 2023

(65) Prior Publication Data

US 2024/0001170 A1 Jan. 4, 2024

Related U.S. Application Data

(60) Provisional application No. 63/427,850, filed on Nov. 24, 2022, provisional application No. 63/427,851, (Continued)

(51) Int. Cl.
*A62B 15/00* (2006.01)
*A62B 7/02* (2006.01)
(Continued)

(52) U.S. Cl.
CPC ................ *A62B 15/00* (2013.01); *A62B 7/02* (2013.01); *A62B 9/006* (2013.01); *A62B 27/00* (2013.01); *G08B 21/02* (2013.01)

(58) Field of Classification Search
CPC ......... A62B 15/00; A62B 13/00; A62B 27/00; A62B 7/00; A62B 7/02; A62B 9/00;
(Continued)

(56) References Cited

U.S. PATENT DOCUMENTS

| | | | |
|---|---|---|---|
| 1,040,311 | A | 10/1912 | Halloran |
| 1,643,155 | A | 9/1927 | Eisenschitz |

(Continued)

FOREIGN PATENT DOCUMENTS

| | | | |
|---|---|---|---|
| AR | 070623 | A1 | 4/2010 |
| AU | 2019101454 | A4 | 1/2020 |

(Continued)

OTHER PUBLICATIONS

Bhatnagar et al., "Machine Learning Techniques to Reduce Error in the Internet of Things," IEEE, 9th International Conference on Cloud Computing, Data Science & Engineering—Confluence—(pp. 403-408).

(Continued)

*Primary Examiner* — Jie Lei
(74) *Attorney, Agent, or Firm* — Foley & Lardner LLP

(57) ABSTRACT

Disclosed are methods and a safety system of a structure for an air/environmental parameter based automatic closing of a valve to isolate breathable air supplied to a level of the structure having the breathable air supplied thereto from a source. In accordance therewith, a parameter of an environment of the level of the structure and/or the breathable air supplied thereto is sensed using a sensor associated with one or more component(s) of the safety system. In response to the sensing, the one or more component(s) automatically closes the valve associated with control of the supply of the breathable air to the level to isolate the breathable air supplied to the level.

18 Claims, 13 Drawing Sheets

Related U.S. Application Data filed on Nov. 24, 2022, provisional application No. 63/427,849, filed on Nov. 24, 2022, provisional application No. 63/359,882, filed on Jul. 11, 2022, provisional application No. 63/357,743, filed on Jul. 1, 2022, provisional application No. 63/357,754, filed on Jul. 1, 2022, provisional application No. 63/356,996, filed on Jun. 29, 2022.

(51) Int. Cl.
*A62B 9/00* (2006.01)
*A62B 27/00* (2006.01)
*G08B 21/02* (2006.01)

(58) Field of Classification Search
CPC .......... A62B 9/006; A62B 9/02; G08B 21/02; G08B 21/00; G08B 21/0036; G08B 21/0219
USPC ......... 359/207.11, 341.42, 512, 820; 96/114, 96/113, 117, 397; 95/1, 10, 12, 19, 23
See application file for complete search history.

(56) References Cited

U.S. PATENT DOCUMENTS

| | | | |
|---|---|---|---|
| 2,341,113 | A | 2/1944 | Nelson |
| 3,429,186 | A | 2/1969 | Price |
| 3,477,688 | A | 11/1969 | Cruse |
| 3,625,065 | A | 12/1971 | Thompson |
| 3,925,763 | A | 12/1975 | Wadhwani et al. |
| 4,014,216 | A | 3/1977 | Thornton |
| 4,023,146 | A | 5/1977 | Carroll |
| 4,091,874 | A | 5/1978 | Monma |
| 4,134,457 | A | 1/1979 | O'Reilly |
| 4,165,738 | A | 8/1979 | Dyer |
| 4,336,590 | A | 6/1982 | Jaco et al. |
| 4,373,522 | A | 2/1983 | Zien |
| 4,375,637 | A | 3/1983 | Desjardins |
| 4,380,187 | A | 4/1983 | Wicks |
| 4,413,622 | A | 11/1983 | Austin |
| 4,467,796 | A | 8/1984 | Beagley |
| 4,570,719 | A | 2/1986 | Wilk |
| 4,856,565 | A | 8/1989 | Schoeffl et al. |
| 4,862,931 | A | 9/1989 | Vella |
| 4,905,684 | A | 3/1990 | Heffer |
| 5,095,899 | A | 3/1992 | Green |
| 5,163,422 | A | 11/1992 | Burgess |
| 5,396,885 | A | 3/1995 | Nelson |
| 5,497,855 | A | 3/1996 | Moore |
| 5,507,283 | A | 4/1996 | Grivas |
| 5,538,690 | A | 7/1996 | Greer et al. |
| 5,564,626 | A | 10/1996 | Kettler et al. |
| 5,570,685 | A | 11/1996 | Turiello |
| 5,619,333 | A | 4/1997 | Staff et al. |
| 5,707,005 | A | 1/1998 | Kettler et al. |
| 5,720,659 | A | 2/1998 | Wicks |
| 5,730,121 | A | 3/1998 | Hawkins et al. |
| 5,746,976 | A | 5/1998 | Yamada et al. |
| 5,800,260 | A | 9/1998 | Kao |
| 5,901,758 | A | 5/1999 | Hwang et al. |
| 5,979,440 | A | 11/1999 | Honkonen et al. |
| 5,992,532 | A | 11/1999 | Ramsey et al. |
| 6,112,807 | A | 9/2000 | Dage |
| 6,310,552 | B1 | 10/2001 | Stumberg et al. |
| 6,357,532 | B1 | 3/2002 | Laskaris et al. |
| 6,369,716 | B1 | 4/2002 | Abbas et al. |
| 6,401,487 | B1 | 6/2002 | Kotliar |
| 6,418,752 | B2 | 7/2002 | Kotliar |
| 6,488,026 | B2 | 12/2002 | Lauer |
| 6,502,421 | B2 | 1/2003 | Kotliar |
| 6,543,444 | B1 | 4/2003 | Lewis |
| 6,585,583 | B1 | 7/2003 | Chan |
| 6,647,301 | B1 | 11/2003 | Sederlund et al. |
| 6,712,071 | B1 | 3/2004 | Parker |
| 6,810,910 | B2 | 11/2004 | McHugh |
| 6,832,952 | B2 | 12/2004 | Faltesek et al. |
| 6,866,102 | B2 | 3/2005 | Boyce et al. |
| 6,873,256 | B2 | 3/2005 | Pedersen et al. |
| 6,920,874 | B1 | 7/2005 | Siegel |
| 6,940,403 | B2 | 9/2005 | Kall et al. |
| 6,999,562 | B2 | 2/2006 | Winick |
| 7,091,852 | B2 | 8/2006 | Mason et al. |
| 7,100,689 | B2 | 9/2006 | Williams et al. |
| 7,124,833 | B2 | 10/2006 | Sant'Angelo |
| 7,161,481 | B2 | 1/2007 | Turner |
| 7,168,428 | B1 | 1/2007 | Zoha |
| 7,183,115 | B1 | 2/2007 | Lauglin |
| 7,186,084 | B2 | 3/2007 | Bunker et al. |
| 7,204,249 | B1 | 4/2007 | Richey et al. |
| 7,221,260 | B2 | 5/2007 | Berezowski et al. |
| 7,250,000 | B2 | 7/2007 | Daniels, II |
| 7,255,104 | B2 | 8/2007 | Phillips |
| 7,302,313 | B2 | 11/2007 | Sharp et al. |
| 7,347,204 | B1 | 3/2008 | Lindsey et al. |
| 7,377,835 | B2 | 5/2008 | Parkulo et al. |
| 7,395,704 | B2 | 7/2008 | Difoggio |
| 7,468,082 | B2 | 12/2008 | Gordon |
| 7,509,968 | B2 | 3/2009 | Surawski |
| 7,527,056 | B2 | 5/2009 | Turiello |
| 7,548,833 | B2 | 6/2009 | Ahmed |
| 7,568,375 | B2 | 8/2009 | Sasaki et al. |
| 7,598,856 | B1 | 10/2009 | Nick et al. |
| 7,621,269 | B2 | 11/2009 | Turiello |
| 7,654,279 | B2 | 2/2010 | Horton et al. |
| 7,658,190 | B1 | 2/2010 | Phifer et al. |
| 7,673,629 | B2 | 3/2010 | Turiello |
| 7,677,247 | B2 | 3/2010 | Turiello |
| 7,694,678 | B2 | 4/2010 | Turiello |
| 7,710,282 | B1 | 5/2010 | Young |
| 7,765,072 | B2 | 7/2010 | Eiler et al. |
| 7,770,610 | B2 | 8/2010 | Lisle |
| 7,804,402 | B2 | 9/2010 | Lang et al. |
| 7,817,050 | B2 | 10/2010 | Goodman et al. |
| 7,823,609 | B2 | 11/2010 | Wonders |
| 7,857,068 | B2 | 12/2010 | Wagner |
| 7,868,752 | B1 | 1/2011 | Herbold |
| 7,880,607 | B2 | 2/2011 | Olson et al. |
| 7,921,869 | B2 | 4/2011 | Surawski |
| 7,934,411 | B2 | 5/2011 | Koch |
| 7,953,228 | B2 | 5/2011 | Faltesek et al. |
| 7,975,729 | B2 | 7/2011 | Lisle |
| 8,038,948 | B1 | 10/2011 | Laughlin |
| 8,074,278 | B2 | 12/2011 | Law et al. |
| 8,077,026 | B2 | 12/2011 | Jobe et al. |
| 8,114,954 | B2 | 2/2012 | DeBruin |
| 8,116,913 | B2 | 2/2012 | Mirpourian et al. |
| 8,147,302 | B2 | 4/2012 | Desrochers et al. |
| 8,149,109 | B2 | 4/2012 | Lontka |
| 8,196,479 | B2 | 6/2012 | Ludwick et al. |
| 8,219,249 | B2 | 7/2012 | Harrod et al. |
| 8,291,941 | B1 | 10/2012 | Berardi |
| 8,371,295 | B2 | 2/2013 | Turiello |
| 8,375,876 | B2 | 2/2013 | Van Tassel |
| 8,375,948 | B2 | 2/2013 | Turiello |
| 8,381,726 | B2 | 2/2013 | Turiello |
| 8,413,653 | B2 | 4/2013 | Turiello |
| 8,443,800 | B2 | 5/2013 | Turiello |
| 8,517,696 | B2 | 8/2013 | McLoughlin et al. |
| 8,538,687 | B2 | 9/2013 | Plocher et al. |
| 8,573,317 | B2 | 11/2013 | Krüger et al. |
| 8,602,119 | B2 | 12/2013 | Wagner |
| 8,611,323 | B2 | 12/2013 | Berger et al. |
| 8,668,023 | B2 | 3/2014 | Wilkins et al. |
| 8,701,718 | B1 | 4/2014 | Turiello |
| 8,733,355 | B2 | 5/2014 | Turiello |
| 8,745,792 | B2 | 6/2014 | McGlynn |
| 8,755,839 | B2 | 6/2014 | Parkulo et al. |
| 8,770,190 | B2 | 7/2014 | Doherty et al. |
| 8,773,946 | B2 | 7/2014 | Padmanabhan et al. |
| 8,795,041 | B2 | 8/2014 | Saito et al. |
| 8,797,141 | B2 | 8/2014 | Best et al. |
| 8,797,210 | B2 | 8/2014 | Derrick et al. |
| 8,866,618 | B2 | 10/2014 | Cotten et al. |

(56) References Cited

U.S. PATENT DOCUMENTS

| | | | |
|---|---|---|---|
| 8,995,946 | B2 | 3/2015 | Miller |
| 9,010,019 | B2 | 4/2015 | Mittelmark |
| 9,032,994 | B2 | 5/2015 | McHugh et al. |
| 9,033,061 | B2 | 5/2015 | Chattaway et al. |
| 9,080,683 | B2 | 7/2015 | Carter et al. |
| 9,105,171 | B2 | 8/2015 | Flood et al. |
| 9,109,981 | B2 | 8/2015 | Sharp |
| 9,134,284 | B1 | 9/2015 | Laughlin |
| 9,175,975 | B2 | 11/2015 | Shtukater |
| 9,220,937 | B2 | 12/2015 | Wagner |
| 9,234,661 | B2 | 1/2016 | Young et al. |
| 9,235,975 | B2 | 1/2016 | Gettings et al. |
| 9,242,126 | B2 | 1/2016 | Turiello |
| 9,243,753 | B2 | 1/2016 | Wonders |
| 9,328,936 | B2 | 5/2016 | Meirav et al. |
| 9,347,677 | B2 | 5/2016 | Eberlein et al. |
| 9,404,666 | B2 | 8/2016 | Terlson et al. |
| 9,466,199 | B2 | 10/2016 | McNabb et al. |
| 9,468,157 | B2 | 10/2016 | Hu |
| 9,564,028 | B2 | 2/2017 | Cerrano |
| 9,566,608 | B2 | 2/2017 | Tran |
| 9,670,670 | B2 | 6/2017 | Teron |
| 9,671,794 | B1 | 6/2017 | Lymberopoulos et al. |
| 9,682,257 | B2 | 6/2017 | Zhao et al. |
| 9,702,802 | B2 | 7/2017 | Ajay et al. |
| 9,724,484 | B2 | 8/2017 | Robey |
| 9,733,149 | B2 | 8/2017 | Eberlein |
| 9,829,895 | B2 | 11/2017 | McLoughlin et al. |
| 9,852,604 | B2 | 12/2017 | Poder |
| 9,875,631 | B2 | 1/2018 | Mittleman et al. |
| 9,927,066 | B1 | 3/2018 | Wonders |
| 9,933,115 | B2 | 4/2018 | Rado et al. |
| 9,964,470 | B2 | 5/2018 | Sharp |
| 10,042,164 | B2 | 8/2018 | Kuutti et al. |
| 10,044,857 | B2 | 8/2018 | Philbin |
| 10,052,509 | B2 | 8/2018 | Wagner |
| 10,062,233 | B1 | 8/2018 | Rogers et al. |
| 10,074,295 | B2 | 9/2018 | Hyman |
| 10,078,865 | B2 | 9/2018 | Joshi et al. |
| 10,078,959 | B2 | 9/2018 | Rossi et al. |
| 10,121,361 | B2 | 11/2018 | Deluliis et al. |
| 10,124,196 | B2 | 11/2018 | Roberts |
| 10,139,282 | B2 | 11/2018 | Chrostowski |
| 10,156,320 | B2 | 12/2018 | Toelle |
| 10,161,923 | B1 | 12/2018 | Laughlin |
| 10,192,411 | B2 | 1/2019 | Wedig et al. |
| 10,311,444 | B1 | 6/2019 | Conboy |
| 10,380,862 | B1 | 8/2019 | Heidary |
| 10,380,863 | B2 | 8/2019 | Wedig et al. |
| 10,400,442 | B2 | 9/2019 | Power et al. |
| 10,417,451 | B2 | 9/2019 | Park et al. |
| 10,426,064 | B2 | 9/2019 | Slessman et al. |
| 10,490,055 | B2 | 11/2019 | Myllymäki |
| 10,503,180 | B2 | 12/2019 | Blackley |
| 10,529,215 | B2 | 1/2020 | Brown |
| 10,531,538 | B2 | 1/2020 | Beghelli |
| 10,563,886 | B2 | 2/2020 | McCormick et al. |
| 10,632,331 | B2 | 4/2020 | Mele |
| 10,639,508 | B2 | 5/2020 | Müller et al. |
| 10,738,943 | B2 | 8/2020 | Tilhof |
| 10,787,803 | B2 | 9/2020 | Leahy |
| 10,789,665 | B2 | 9/2020 | Comello |
| 10,808,396 | B2 | 10/2020 | Zhang et al. |
| 10,834,482 | B2 | 11/2020 | Speicher et al. |
| 10,890,294 | B2 | 1/2021 | Santos et al. |
| 10,901,373 | B2 | 1/2021 | Locke et al. |
| 10,969,131 | B2 | 4/2021 | Sinha et al. |
| 11,009,186 | B2 | 5/2021 | Sung |
| 11,027,236 | B2 | 6/2021 | Maayan et al. |
| 11,045,800 | B1 | 6/2021 | Kaplan et al. |
| 11,055,973 | B2 | 7/2021 | Wedig et al. |
| 11,070,390 | B2 | 7/2021 | Park et al. |
| 11,111,767 | B2 | 9/2021 | Anders |
| 11,135,461 | B2 | 10/2021 | Beechy et al. |
| 11,162,181 | B2 | 11/2021 | Harano et al. |
| 11,181,875 | B2 | 11/2021 | Kummer et al. |
| 11,185,650 | B2 | 11/2021 | Almqvist |
| 11,187,223 | B2 | 11/2021 | Ward et al. |
| 11,191,222 | B2 | 12/2021 | Cho et al. |
| 11,226,604 | B2 | 1/2022 | Goyal |
| 11,238,187 | B2 | 2/2022 | Nikolayev et al. |
| 11,391,474 | B2 | 7/2022 | Eplee |
| 11,410,539 | B2 | 8/2022 | Kasiviswanathan |
| 11,426,553 | B2 | 8/2022 | Dube et al. |
| 11,439,856 | B2 | 9/2022 | Laskaris et al. |
| 11,514,764 | B2 | 11/2022 | Correnti et al. |
| 11,536,476 | B2 | 12/2022 | Nesler et al. |
| 11,626,002 | B2 | 4/2023 | Donegan et al. |
| 11,719,625 | B2 | 8/2023 | Carras et al. |
| 11,768,138 | B2 | 9/2023 | Jamison et al. |
| 11,810,216 | B1 | 11/2023 | Foiles et al. |
| 11,964,269 | B2 | 4/2024 | Kaplan et al. |
| 12,046,125 | B2 | 7/2024 | Nalukurthy et al. |
| 12,339,267 | B2 | 6/2025 | Lazea et al. |
| 12,345,433 | B2 | 7/2025 | Pham et al. |
| 12,411,118 | B2 | 9/2025 | McManus et al. |
| 12,440,714 | B2 | 10/2025 | Schmitt et al. |
| 2001/0032892 | A1 | 10/2001 | Brooks et al. |
| 2002/0121381 | A1 | 9/2002 | Reilly |
| 2002/0185283 | A1 | 12/2002 | Taylor |
| 2003/0183300 | A1 | 10/2003 | Siebert |
| 2004/0045350 | A1 | 3/2004 | Jones et al. |
| 2004/0182394 | A1 | 9/2004 | Alvey et al. |
| 2005/0066711 | A1 | 3/2005 | Discenzo |
| 2005/0280527 | A1 | 12/2005 | Farley |
| 2006/0005880 | A1 | 1/2006 | Baker et al. |
| 2006/0173579 | A1 | 8/2006 | Desrochers et al. |
| 2006/0173580 | A1 | 8/2006 | Desrochers et al. |
| 2006/0196254 | A1 | 9/2006 | Fjerdingstad et al. |
| 2006/0213513 | A1 | 9/2006 | Seong |
| 2006/0234621 | A1 | 10/2006 | Desrochers et al. |
| 2007/0017520 | A1 | 1/2007 | Gale et al. |
| 2007/0163578 | A1 | 7/2007 | Lisle |
| 2007/0175470 | A1 | 8/2007 | Brookman et al. |
| 2008/0041377 | A1 | 2/2008 | Turiello |
| 2008/0041378 | A1 | 2/2008 | Turiello |
| 2008/0041379 | A1 | 2/2008 | Turiello |
| 2008/0105443 | A1 | 5/2008 | Molz et al. |
| 2008/0236846 | A1 | 10/2008 | Gamble et al. |
| 2009/0058669 | A1 | 3/2009 | Santos |
| 2009/0159365 | A1 | 6/2009 | O'Brien |
| 2009/0178675 | A1 | 7/2009 | Turiello |
| 2009/0283151 | A1 | 11/2009 | Turiello |
| 2010/0031955 | A1 | 2/2010 | Turiello |
| 2010/0032040 | A1 | 2/2010 | Turiello |
| 2010/0081411 | A1 | 4/2010 | Montenero |
| 2010/0084043 | A1 | 4/2010 | Turiello |
| 2010/0147297 | A1 | 6/2010 | Brewer et al. |
| 2010/0154922 | A1 | 6/2010 | Turiello |
| 2010/0201536 | A1 | 8/2010 | Robertson et al. |
| 2011/0187524 | A1 | 8/2011 | Cochran, III |
| 2011/0192479 | A1 | 8/2011 | Yokota |
| 2011/0259198 | A1 | 10/2011 | Kim et al. |
| 2011/0259580 | A1 | 10/2011 | Head |
| 2011/0277490 | A1 | 11/2011 | Meirav |
| 2012/0031525 | A1 | 2/2012 | Wonders |
| 2012/0215488 | A1 | 8/2012 | Carter et al. |
| 2012/0266889 | A1 | 10/2012 | Roberts |
| 2013/0033377 | A1 | 2/2013 | Hoseit |
| 2013/0086933 | A1 | 4/2013 | Holtkamp et al. |
| 2013/0087153 | A1 | 4/2013 | Jung |
| 2013/0105010 | A1 | 5/2013 | McLoughlin |
| 2014/0077110 | A1 | 3/2014 | Gamard et al. |
| 2014/0188286 | A1 | 7/2014 | Hunka |
| 2014/0232876 | A1 | 8/2014 | Dougherty |
| 2014/0261406 | A1 | 9/2014 | Fabian |
| 2014/0338927 | A1 | 11/2014 | Palle |
| 2014/0349707 | A1 | 11/2014 | Bang |
| 2015/0033765 | A1 | 2/2015 | Blalock |
| 2015/0077737 | A1 | 3/2015 | Belinsky et al. |
| 2015/0096768 | A1 | 4/2015 | DuBrucq et al. |
| 2015/0130205 | A1 | 5/2015 | Caskey |
| 2015/0131262 | A1 | 5/2015 | Mabry |
| 2015/0170486 | A1 | 6/2015 | Penland |

(56) References Cited

U.S. PATENT DOCUMENTS

| | | | |
|---|---|---|---|
| 2015/0204484 | A1 | 7/2015 | Modirzareh et al. |
| 2015/0217518 | A1 | 8/2015 | Chun et al. |
| 2015/0330873 | A1 | 11/2015 | Atchison |
| 2015/0369498 | A1 | 12/2015 | Motomura et al. |
| 2016/0003524 | A1 | 1/2016 | Blalock |
| 2016/0114196 | A1 | 4/2016 | Tribble |
| 2016/0116181 | A1 | 4/2016 | Aultman et al. |
| 2016/0121151 | A1 | 5/2016 | Schmitt et al. |
| 2016/0133108 | A1 | 5/2016 | Bucsa et al. |
| 2016/0136017 | A1 | 5/2016 | Caskey |
| 2016/0138759 | A1 | 5/2016 | Rado et al. |
| 2016/0197772 | A1 | 7/2016 | Britt et al. |
| 2016/0334061 | A1 | 11/2016 | Toelle |
| 2016/0343187 | A1 | 11/2016 | Trani |
| 2017/0006107 | A1 | 1/2017 | Dawes et al. |
| 2017/0084156 | A1 | 3/2017 | Myllymäki |
| 2017/0122580 | A1 | 5/2017 | Karamanos et al. |
| 2017/0180829 | A1 | 6/2017 | Schwarzkopf et al. |
| 2017/0236397 | A1 | 8/2017 | Myslenski et al. |
| 2017/0303580 | A1 | 10/2017 | Cameron et al. |
| 2017/0310498 | A1 | 10/2017 | Brandman et al. |
| 2018/0181094 | A1 | 6/2018 | Funk et al. |
| 2018/0197393 | A1 | 7/2018 | Gallo et al. |
| 2018/0200552 | A1 | 7/2018 | Wertsberger |
| 2018/0243591 | A1 | 8/2018 | DeWitt |
| 2018/0283614 | A1 | 10/2018 | Gandolfo |
| 2018/0363939 | A1 | 12/2018 | McCormick et al. |
| 2018/0375444 | A1 | 12/2018 | Gamroth |
| 2019/0023529 | A1 | 1/2019 | Lau |
| 2019/0103986 | A1 | 4/2019 | Brandman et al. |
| 2019/0143161 | A1 | 5/2019 | Burkhart et al. |
| 2019/0171780 | A1 | 6/2019 | Santarone et al. |
| 2019/0174208 | A1 | 6/2019 | Speicher et al. |
| 2019/0203885 | A1 | 7/2019 | Sung |
| 2019/0277449 | A1 | 9/2019 | Bourgeois et al. |
| 2019/0282839 | A1 | 9/2019 | Wenzel et al. |
| 2020/0012307 | A1 | 1/2020 | Scelzi |
| 2020/0054905 | A1 | 2/2020 | Livchak et al. |
| 2020/0107475 | A1 | 4/2020 | Keisling et al. |
| 2020/0143300 | A1 | 5/2020 | Weldemariam et al. |
| 2020/0225313 | A1 | 7/2020 | Coles |
| 2020/0232309 | A1 | 7/2020 | Deutch et al. |
| 2020/0294372 | A1 | 9/2020 | Rodriguez |
| 2020/0334778 | A1 | 10/2020 | Lotter |
| 2020/0349661 | A1 | 11/2020 | Dutta et al. |
| 2021/0023323 | A1 | 1/2021 | Wilkinson et al. |
| 2021/0038926 | A1 | 2/2021 | Reedy |
| 2021/0113864 | A1 | 4/2021 | Nam |
| 2021/0183218 | A1 | 6/2021 | Johnson et al. |
| 2021/0237309 | A1 | 8/2021 | Tessien |
| 2021/0241595 | A1 | 8/2021 | Young et al. |
| 2021/0268322 | A1 | 9/2021 | Thomas et al. |
| 2021/0280034 | A1 | 9/2021 | Wedig et al. |
| 2021/0297336 | A1 | 9/2021 | Ramakrishnaiah et al. |
| 2021/0299495 | A1 | 9/2021 | Feenstra et al. |
| 2021/0311008 | A1 | 10/2021 | Hill |
| 2021/0358238 | A1 | 11/2021 | Rogers et al. |
| 2021/0379429 | A1 | 12/2021 | Darnell |
| 2022/0010996 | A1 | 1/2022 | Carrieri |
| 2022/0019186 | A1 | 1/2022 | De Andrade et al. |
| 2022/0099641 | A1 | 3/2022 | Desrochers |
| 2022/0103914 | A1 | 3/2022 | Lotter |
| 2022/0134147 | A1 | 5/2022 | Webb et al. |
| 2022/0233900 | A1 | 7/2022 | Williams |
| 2022/0260270 | A1 | 8/2022 | Abate et al. |
| 2022/0297110 | A1 | 9/2022 | Kaplan et al. |
| 2022/0404056 | A1 | 12/2022 | Bloemer et al. |
| 2023/0034481 | A1 | 2/2023 | Benton et al. |
| 2023/0070772 | A1 | 3/2023 | Bingham et al. |
| 2023/0173128 | A1 | 6/2023 | Slotkin et al. |
| 2023/0298346 | A1 | 9/2023 | Alshammary |
| 2023/0319241 | A1 | 10/2023 | Turiello et al. |
| 2024/0001161 | A1 | 1/2024 | Turiello |
| 2024/0001178 | A1 | 1/2024 | Turiello |
| 2024/0036537 | A1 | 2/2024 | Gupta et al. |
| 2025/0216034 | A1 | 7/2025 | Despres et al. |

FOREIGN PATENT DOCUMENTS

| | | | |
|---|---|---|---|
| AU | 2021105506 | A4 | 11/2021 |
| CA | 2760676 | A1 | 11/2010 |
| CN | 101853549 | A | 10/2010 |
| CN | 101968244 | A | 2/2011 |
| CN | 201775882 | U | 3/2011 |
| CN | 202052220 | U | 11/2011 |
| CN | 202078672 | U | 12/2011 |
| CN | 202615547 | U | 12/2012 |
| CN | 102739786 | B | 4/2013 |
| CN | 101298769 | B1 | 8/2013 |
| CN | 203154649 | U | 8/2013 |
| CN | 203160791 | U | 8/2013 |
| CN | 203190560 | U | 9/2013 |
| CN | 102364016 | B | 2/2014 |
| CN | 102500021 | B | 7/2014 |
| CN | 203799482 | U | 8/2014 |
| CN | 102365458 | B | 9/2014 |
| CN | 104056374 | A | 9/2014 |
| CN | 104826248 | A | 8/2015 |
| CN | 204534128 | U | 8/2015 |
| CN | 104906717 | A | 9/2015 |
| CN | 205031799 | U | 2/2016 |
| CN | 104260763 | B | 8/2016 |
| CN | 105917208 | A | 8/2016 |
| CN | 106310553 | A | 1/2017 |
| CN | 106899665 | A | 6/2017 |
| CN | 105143778 | B | 8/2017 |
| CN | 105247269 | A | 9/2017 |
| CN | 206808757 | U | 12/2017 |
| CN | 107991999 | A | 5/2018 |
| CN | 105892538 | B | 8/2018 |
| CN | 207750720 | U | 8/2018 |
| CN | 106546008 | A | 9/2018 |
| CN | 105091097 | B | 1/2019 |
| CN | 105547285 | A | 1/2019 |
| CN | 208536257 | U | 2/2019 |
| CN | 109859368 | A | 6/2019 |
| CN | 109939387 | A | 6/2019 |
| CN | 110469950 | A | 11/2019 |
| CN | 110478804 | A | 11/2019 |
| CN | 110494811 | A | 11/2019 |
| CN | 110673739 | A | 1/2020 |
| CN | 209926530 | U | 1/2020 |
| CN | 210135667 | U | 3/2020 |
| CN | 111210588 | A | 5/2020 |
| CN | 210739978 | U | 6/2020 |
| CN | 111544817 | A | 8/2020 |
| CN | 110047240 | B | 10/2020 |
| CN | 109404582 | B | 11/2020 |
| CN | 112344484 | A | 2/2021 |
| CN | 212491267 | U | 2/2021 |
| CN | 112657081 | A | 4/2021 |
| CN | 108295407 | B | 5/2021 |
| CN | 111258251 | A | 5/2021 |
| CN | 113365029 | A | 9/2021 |
| CN | 110493568 | B | 10/2021 |
| CN | 111243219 | A | 11/2021 |
| CN | 214550694 | U | 11/2021 |
| CN | 113769292 | A | 12/2021 |
| CN | 113842716 | A | 12/2021 |
| CN | 114146332 | A | 3/2022 |
| CN | 114205385 | A | 3/2022 |
| CN | 114235301 | A | 3/2022 |
| CN | 106678991 | B | 5/2022 |
| CN | 114613092 | A | 6/2022 |
| CN | 216855578 | U | 7/2022 |
| CN | 217526213 | U | 10/2022 |
| CN | 115645769 | A | 1/2023 |
| EP | 2320397 | B1 | 5/2012 |
| EP | 2 151 263 | B1 | 3/2014 |
| EP | 2 982 416 | A1 | 2/2016 |
| EP | 2373384 | B1 | 10/2018 |
| GB | 2248884 | A | 4/1992 |

(56) References Cited

FOREIGN PATENT DOCUMENTS

| | | | |
|---|---|---|---|
| JP | H06-343709 | A | 12/1994 |
| JP | H08-124064 | A | 5/1996 |
| JP | 3397382 | B2 | 4/2003 |
| JP | 2004-298554 | A | 10/2004 |
| JP | 2005291634 | A | 10/2005 |
| JP | 5117700 | B2 | 1/2013 |
| JP | 5654124 | B2 | 1/2015 |
| JP | 5719010 | B2 | 5/2015 |
| JP | 6189404 | B2 | 8/2017 |
| JP | 6321134 | B2 | 5/2018 |
| JP | 2021186616 | A | 12/2021 |
| JP | 7109988 | B2 | 8/2022 |
| KR | 20050097400 | A | 10/2005 |
| KR | 100880023 | B1 | 2/2009 |
| KR | 10-2010-0012689 | A | 2/2010 |
| KR | 100945260 | B1 | 3/2010 |
| KR | 10-2010-0115024 | A | 10/2010 |
| KR | 101024944 | B1 | 3/2011 |
| KR | 20110078600 | A | 7/2011 |
| KR | 10-1088547 | B1 | 11/2011 |
| KR | 20110002589 | U | 11/2011 |
| KR | 101089513 | B1 | 12/2011 |
| KR | 101208662 | B1 | 12/2012 |
| KR | 20130017610 | A | 8/2013 |
| KR | 101722045 | B1 | 3/2017 |
| KR | 101747360 | B1 | 6/2017 |
| KR | 101762550 | B1 | 7/2017 |
| KR | 10-1840682 | B1 | 10/2017 |
| KR | 101790694 | B1 | 11/2017 |
| KR | 20170138810 | A | 12/2017 |
| KR | 101815533 | B1 | 1/2018 |
| KR | 101841954 | B1 | 3/2018 |
| KR | 101845263 | B1 | 4/2018 |
| KR | 101845264 | B1 | 5/2018 |
| KR | 101859878 | B1 | 5/2018 |
| KR | 101859955 | B1 | 5/2018 |
| KR | 101887164 | B1 | 9/2018 |
| KR | 101902976 | B1 | 10/2018 |
| KR | 102050539 | B1 | 2/2019 |
| KR | 10-2019-0043669 | A | 4/2019 |
| KR | 20180001140 | U | 6/2019 |
| KR | 101996949 | B1 | 7/2019 |
| KR | 102008625 | B1 | 8/2019 |
| KR | 101994222 | B1 | 9/2019 |
| KR | 102035835 | B1 | 10/2019 |
| KR | 10-2019-0131158 | A | 11/2019 |
| KR | 10-2020-0027390 | A | 3/2020 |
| KR | 102169547 | B1 | 10/2020 |
| KR | 102263178 | B1 | 6/2021 |
| KR | 102277919 | B1 | 7/2021 |
| KR | 102300167 | B1 | 9/2021 |
| KR | 102355909 | B1 | 2/2022 |
| KR | 20220056659 | A | 5/2022 |
| NL | 2019479 | B1 | 8/2018 |
| RU | 74076 | U | 6/2008 |
| RU | 2465933 | C2 | 11/2012 |
| RU | 2717525 | C1 | 3/2020 |
| RU | 2724093 | C1 | 6/2020 |
| TW | 201425832 | A | 9/2015 |
| TW | M540352 | U | 4/2017 |
| WO | 2003031892 | A1 | 4/2003 |
| WO | 2006047246 | A2 | 5/2006 |
| WO | 2008021538 | A2 | 2/2008 |
| WO | 2010063266 | A1 | 6/2010 |
| WO | 2011034334 | A2 | 3/2011 |
| WO | 2014208865 | A1 | 12/2014 |
| WO | 2016205053 | A1 | 12/2016 |
| WO | 2018038434 | A1 | 3/2018 |
| WO | 2018176196 | A1 | 10/2018 |
| WO | 2018236571 | A1 | 12/2018 |
| WO | WO-2021/250389 | A1 | 12/2021 |
| WO | 2022066099 | A1 | 3/2022 |
| WO | 2023000087 | A1 | 1/2023 |

OTHER PUBLICATIONS

ENMET—Product Information, "Compressed Airline Monitors & Respiratory Air Monitors & Portable Breathing Air Systems," 2025 (2 pages).

Kinaeva et al., "Machine Learning Algorithms for Regression Analysis and Predictions of Numerical Data," 2021 3rd International Congress on Human—Computer Interaction, Optimization and Robotic Applications, 2021 (pp. 1-6).

Rush III, J.D., "Monitor Your Air Supply" Fire Engineering, 2014 (2 pages).

Trevino, "What Every Firefighter Needs to Know About FARS," Fire Apparatus & Emergency Equipment, 2016 (pp. 1-8).

"Influence of Intemal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.

"Indoor air quality in green buildings: A case-study in a residential high-rise building in the northeastern United States", Published at Journal of Environmental Science and Health, Published on [Feb. 2015] http://surl.li/fdzxk.

"Indoor Air-Quality Data-Monitoring System: Long-Term Monitoring Benefits", Published at MDIP, Published on [Sep. 25, 2019] https://www.mdpi.com/1424-8220/19/19/4157.

"A review of air filtration technologies for sustainable and healthy building ventilation", Published at Sustainable Cities and Society, Published on [Jul. 2017] https://core.ac.uk/download/pdf/84587706.pdf.

"A novel constant-air-volume range hood for high-rise residential buildings with 2 central shaft", Published at Energy and Buildings, Published on [May 2021] http://surl.li/feadf.

"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.

"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.

"Fire Safety", Published at Atomic Energy Regulatory Board India, Published on [May 2019] https://aerb.gov.in/images/PDF/fire.pdf.

"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.

"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.

"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.

"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.

"Real-time sensors for indoor air monitoring and challenges ahead in deploying them to urban buildings", Published at Science of The Total Environment , Published on [Apr. 2016] https://eprints.ncl.ac.uk/file_store/production/223286/749E8E7D-D1EF-4056-BCDD-F48812167CB1.pdf.

"Indoor air quality and energy management through real-time sensing in commercial buildings ", Published at Energy and Buildings, Published on [Jan. 2016] https://eprints.qut.edu.au/220977/1/93777.pdf.

"Compressors and Compressed Air Systems", Published at Continuing Education and Development, Found on [Mar. 2023] https://www.cedengineering.com/userfiles/Compressors%20and%20Compressed%20Air%20Systems%20R1.pdf.

(56) References Cited

OTHER PUBLICATIONS

"HVAC System", Published at Energy Conservation Building Code (ECBC) Tip Sheet, Published on [Jun. 2009] https://www.keralaenergy.gov.in/files/HVAC_System_Tip_Sheet.pdf.
"Air distribution of oxygen supply through guardrail slot diffusers in high-altitude hypoxic areas", Published at Building and Environment, Published on [Apr. 2020] https://rb.gy/9ktde6.
"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf;jsessionid=6F0E7E29FB3FF03D59759181BA6A6161?sequence=1.
"Rescue Air for Firefighters", Published at Fire Engineering, Published on [Sep. 8, 2014] https://rescueair.com/wp-content/uploads/2020/03/rescue-air-for-firefighters.whitepaperpdf.render.pdf.
"The Case for Interior High-Rise Breathing Air Systems ", Published at Fire Engineering, Published on [Apr. 2012] https://rescueair.com/wp-content/uploads/2014/05/Rush-Article.pdf.
"RF Based Advance Smart Fire Safety System for Industries and Shopping Malls", Published at International Journal of Science and Research (IJSR), Published on [Dec. 2018] https://www.jsr.net/archive/v7/12/ART20193898.pdf.
"Design and Implementation of Car Fire Detection and Automatic Car Door Opening Using IOT", Published at International Journal of Advances in Engineering and Management (IJAEM), Published on [Jul. 7, 2022] https://ijaem.net/issue_dcp/Design%20and%20Implementation%20of%20Car%20Fire%20Detection%20and%20Automatic%20Car%20Door%20Opening%20Using%20lot.pdf.
"Machine Vision Based Fire Detection Techniques: A Survey", Published at Springer Nature, Published on [Nov. 27, 2020] https://sci-hub.hkvisa.net/10.1007/s10694-020-01064-z.
"An Analysis of Firefighter Breathing Air Replenishment Systems", Published at Fire Protection Research Foundation , Published o[Apr. 2021] https://www.nfpa.org/-/media/Files/News-and-Research/Fire-statistics-and-reports/Emergency-responders/ RFFAnalysisOfFFBARS.pdf.
"Fire Detection Systems in Wireless Sensor Networks", Published at World Conference on Technology, Innovation and Entrepreneurship, Published on [Jul. 3, 2015] https://www.sciencedirect.com/science/article/pil/S1877042815038872.
"Fire Safety System Building", Published at IOP Conference Series: Materials Science and Engineering, Published on [Nov. 2019] https://www.researchgate.net/publication/337402246_Fire_Safety_System_Building/ fulltext/5dd573ae299bf11ec866bf2c/Fire-Safety-System-Building.pdf.
"SmartFire: Intelligent Platform for Monitoring Fire Extinguishers and Their Building Environment", Published at MDPI, Published on [May 25, 2019] https://www.mdpi.com/1424-8220/19/10/2390.
"A Smart Fire Detection System using IoT Technology With Automatic Water Sprinkler", Published at International Journal of Electrical and Computer Engineering (IJECE), Published on [Oct. 7, 2020] http://surl.li/esuhn.
"Situational Awareness for first responders:Evaluation of the BIMS field trial", Published at IEEE Xplore, Published on [Dec. 9, 2009] http://surl.li/esuid.
"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/ links/5bb62f01299bf1049b6f57d7/Fire-Safety-in-Buildings.pdf.
"Ignis: Fire Detection and Mitigation System", Published at International Research Journal of Engineering and Technology (IRJET) , Published on [Jun. 6, 2021 ] https://www.irjet.net/archives/V8/16/IRJET-V816493.pdf.
"An Intelligent Fire Detection and Mitigation System Safe from Fire (SFF)s", Published at International Journal of Computer Applications, Published on [Jan. 2016] https://www.ljcaonline.org/research/volume133/number6/mobin-2016-ljca-907858.pdf.
"Smart Fire Alert System Using IOT", Published at International Research Journal of Modernization in Engineering Technology and Science, Published on [Mar. 3, 2022 ].https://www.irjmets.com/uploadedfiles/paper/issue_3_march_2022/20213/final/fin_irjmets1648303966.pdf.
"Johnson Controls Acquires Rescue Air Systems To Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire- suppression-portfolio-co-5246-ga-co-1665048943-ga.1665049545.pdf.
"5.07 Air Replenishment Systems (2019)", Published at San Francisco Fire Department Bureau of Fire Prevention & Investigation, Found Online on [Feb. 8, 2014] https://sf-fire.org/media/1220/download?inline.
"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.
"Firefighter Air Replenishment Systems (FARS) Air Quality Fact Sheet ", Published at Firefighter Air Coalition, Publish Online on [Feb. 8, 2014] https://aircoalition.org/wp-content/uploads/2021/03/FAC-FARS-Air-Quality-White-Paper.pdf.
"Technical Brief on System Controls for Industrial Compressed Air Systems", Published at Compressed Air And Gas Institute, Found Online on [Feb. 15, 2022] https://www.cagi.org/assets/documents/pdfs/SystemControlsTechnicalBrief.pdf?updated=1657712699.
"Case Study—System Controls", Published at Compressed Air And Gas Institute, Found Online on [Feb. 15, 2022] https://www.cagl.org/assets/documents/pdfs/SystemControlsCaseStudy.pdf?updated=1657712699.
"Technical BriefZZZ—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.
"Technical Brief on Distribution Piping Network", Published at Compressed Air And Gas Institute, Found Online on [Feb. 15, 2022] https://www.cagl.org/assets/documents/pdfs/DistributionPipingNetworkTechnicalBrief.pdf?updated=1657712699.
"Technical Brief on Pressure Drop", Published at Compressed Air And Gas Institute, Found Online on [Feb. 15, 2022] https://www.cagi.org/assets/documents/pdfs/PressureDropTechnicalBrief.pdf?updated=1657712700.
"Technical Brief on Variable Speed Drive", Published at Compressed Air And Gas Institute, Found Online on [Feb. 15, 2022] https://www.cagi.org/assets/documents/pdfs/VariableSpeed-DriveTechnicalBrief.pdf?updated=1657712699.
"Compressor Room Advantages with Oil-Free Centrifugal Air Compressors", Published at Compressed Air And Gas Institute, Found Online on [Feb. 15, 2022] https://www.cagl.org/pdf/downloads/compressor-room-advantages-with-oil-free-centrifugal-air-compressors.
"Technical Brief—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.
"Preparing Reciprocating Air Compressors for Winter", Published at Compressed Air And Gas Institute, Found Online on [Feb. 15, 2022] https://www.cagi.org/pdf/downloads/preparing-reciprocating-air-compressors-for-winter.
"Nitrogen Characteristics and Benefits of On-Site Generation", Published at Compressed Air And Gas Institute, Found Online on [Feb. 15, 2022] https://www.cagi.org/pdf/downloads/19-nitrogen-characteristics-and-benefits-of-on-site-generation.
"Key Considerations for Installing Centrifugal Air Compressors", Published at Compressed Air And Gas Institute, Found Online on [Feb. 15, 2022] https://www.cagi.org/pdf/downloads/20-key-considerations-for-installing-centrifugal-air-compressors.
"Compressed Air & Gas Handbook", Published at Compressed Air And Gas Institute, Found Online on [Feb. 15, 2022] https://www.cagi.org/handbook-pdfs/handbook-chapter-1.

(56) References Cited

OTHER PUBLICATIONS

"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.
"Fire Hazard in Buildings: Review,Assessment and Strategies For Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review- assessment-and-strategies-for-improving-fire-safety.
"Environmental Study Of Firefighters", Published at University of California, Publish on [Sep. 8, 2015] https://sci-hub.hkvisa.net/10.1093/annhyg/35.6.581.
"Summary of human responses to ventilation", Published at California Digital Library University of Clifioria, Publish on [Jun. 1, 2004] https://escholarship.org/content/qt64k2p4dc/qt64k2p4dc.pdf.
"Fixed Fire Protection Systems in Tunnels:Issues and Directions", Published at Fire Technology, Publish on [Sep. 30, 2010] https://sci-hub.hkvisa.net/10.1007/s10694-011-0220-2.
"Comparison of Underfloor Vs. Overhead Air Distribution Systems in an Office Building", Published at Department of Architecture, Waseda University, Found Online on [Feb. 15, 2022] https://www.airfixture.com/wp-content/uploads/2016/07/ASHRAE-Underfloor-vs-Overhead-Study.pdf.
"General Requirements in piping Design", Published at RMIT University in partnership with Informit Open, Publish on [Jul. 2021] https://search.informit.org/doi/epdf/10.3316/informit.947188479100130.
"Optimal operation of heat supply systems with piping network", Published at Department of Mechanical Engineering, Osaka Prefecture University, Publish on [ Oct. 14, 2016] https://sci-hub.hkvisa.net/10.1016/j.energy.2017.03.146.
"Compressed Air Piping Network Inspection And Documentation For PAROC", Published at Turku University of Applied Sciences, Found Online on [Feb. 15, 2022] https://www.theseus.fi/bitstream/handle/10024/122415/Myllyniemi_Jani.pdf?sequence=1.
"Natural Gas Pipeline Technology Overview", Publish at Argonne National Laboratory, Publish on [ Nov. 2007] https://publications.anl.gov/anlpubs/2008/02/61034.pdf.
"Improving the indoor air quality using the individual air supply system", Publish at Int. J. Environ. Sci. Technol., Publish on [ Jul. 24, 2017] https://link.springer.com/content/pdf/10.1007/s13762-017-1432-x.pdf?pdf=button.
"Analytical Modeling of Fire Smoke Spread in High-rise Buildings", Publish at Concordia University Montreal, Quebec, Canada Publish on [ Sep. 2016] https://core.ac.uk/download/pdf/211519293.pdf.
International Search Report and Written Opinion for Appl. Ser. No. PCT/IB2024/050603 dated Apr. 24, 2024 (10 pages).
International Search Report and Written Opinion issued in connection with PCT/US2023/014763 dated Jun. 21, 2023 (8 pages).
International Search Report and Written Opinion issued in connection with PCT/US2023/014764 dated Jun. 23, 2023 (9 pages).
International Search Report and Written Opinion issued in connection with PCT/US2023/014765 dated Jun. 27, 2023 (10 pages).
International Search Report and Written Opinion issued in connection with PCT/US2023/017653 dated Jul. 24, 2023 (9 pages).
International Search Report and Written Opinion issued in connection with PCT/US2023/017656 dated Jul. 19, 2023 (10 pages).
International Search Report and Written Opinion issued in connection with PCT/US2023/017803 dated Jul. 24, 2023 (8 pages).
International Search Report and Written Opinion issued in connection with PCT/US2023/018401 dated Jul. 27, 2023 (10 pages).
International Search Report and Written Opinion issued in connection with PCT/US2023/019880 dated Aug. 2, 2023 (8 pages).
International Search Report and Written Opinion issued in connection with PCT/US2023/022222 dated Aug. 24, 2023 (11 pages).
International Search Report and Written Opinion issued in connection with PCT/US2023/022223 dated Sep. 4, 2023 (7 pages).
International Search Report and Written Opinion issued in connection with PCT/US2023/024766 dated Oct. 4, 2023 (7 pages).
International Search Report and Written Opinion issued in connection with PCT/US2023/025646 dated Oct. 11, 2023 (10 pages).
International Search Report and Written Opinion issued in connection with PCT/US2023/025647 dated Oct. 4, 2023 (10 pages).
International Search Report and Written Opinion issued in connection with PCT/US2023/026172 dated Oct. 31, 2023 (9 pages).
International Search Report and Written Opinion issued in connection with PCT/US2023/026174 dated Oct. 20, 2023 (7 pages).
International Search Report and Written Opinion issued in connection with PCT/US2023/026176 dated Oct. 17, 2023 (7 pages).
International Search Report and Written Opinion issued in connection with PCT/US2023/026425 dated Oct. 17, 2023 (12 pages).
International Search Report and Written Opinion issued in connection with PCT/US2023/026428 dated Oct. 17, 2023 (8 pages).
International Search Report and Written Opinion issued in connection with PCT/US2023/026466 dated Nov. 1, 2023 (8 pages).
"Chapter 6 Fire-Fighting Systems" https://www.globalsecurity.org/military/library/policy/navy/nrtc/14057_ppr_ch6.pdf.
"Research and Perspectives on Fire-Fighting Systems in Tunnels under Strong Piston Wind Action", By Xiaoyi Zhao et al., Published at Construction Management, and Computers & Digitization, Published on [Jan. 31, 2023] https://www.mdpi.com/2075-5309/13/2/435.
"Wireless sensor network applications in monitoring and control of gas networks ", By Sajad Balall Dehkordi et al., Published at Majlesi Journal of Telecommunication Devices , Published on [Jun. 23, 2012] https://mjtd.isfahan.lau.ir/article_695667_a4c0e30293098b0ac5497f27c43f5bb9.pdf.
"Sustainability of Air Supply in Areas Immediately Dangerous to Life and Health", By Christopher W. Norris, Published at Northampton Fire Department,MA , Published in [Feb. 2008] https://apps.usfa.fema.gov/pdf/efop/efo41710.pdf.
"Sensor-based safety management", By Amin Asadzadeh et al., Published at Automation in Construction , Published on [Feb. 7, 2020] https://sci-hub.hkvisa.net/10.1016/j.autcon.2020.103128.
"Remote Monitoring and Control Using Mobile Phones", By Dr. Mikael Sjodin, Published at Newline Information , Published in [Nov. 2001] http://www.es.mdh.se/pdf_publications/413.pdf.
"Monitored Performance of an Office Buildingwith an Under-Floor Air Distribution System ", By Christine E. Walker et al., Published at Fifth International Conference for Enhanced Building Operations, Pittsburgh, Pennsylvania , Published on [Oct. 13, 2005] https://oaktrust.library.tamu.edu/bitstream/handle/1969.1/5105/ESL-IC-05-10-13.pdf?sequence=4.
"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.
"Firefighter Fatalities in the US in 2021", By Richard Campbell et al., Published at National Fire Protection Association (NFPA), Published in [Jun. 2023] https://www.nfpa.org/-/media/Files/News-and-Research/Fire-statistics-and-reports/Emergency-responders/osFFF.pdf.
"Reversible Longitudinal Smoke Extraction System in Enclosed Underground Parking Structure", By KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.
"Mapping Fire and Firefighter Visibility for Improving Situational Awareness", By Katherine Ann Mistick, Published at The University of Utah ProQuest Dissertations , Published in [May 2022] https://www.proquest.com/openview/089c0ac0998979da3b550b77ddee2bf1/1?pq-origsite=gscholar&cbl=18750&diss=y.
"An ultra-wide band indoor personnel tracking system for emergency situations (Europcom)", By Anthony Putorti Jr. et al., Published at Radar Conference, 2008. EuRAD 2008. European, Published in [Dec. 2008] http://surl.li/hqxep.

(56) References Cited

OTHER PUBLICATIONS

"Threat modeling in smart firefighting systems: Aligning MITRE ATT&CK matrix and NIST security controls", Shahzaib Zahid et al., Published at Internet of Things, Published on [Mar. 21, 2023] https://tinyurl.com/msjusd3y.
"Autonomous Fire Suppression Systemfor Use in High and Low VisibilityEnvironments by Visual Servoing", By Joshua G. McNeil et al., Published at Fire Technology 2016, Published on [ Jan. 7, 2016] https://sci-hub.hkvisa.net/10.1007/s10694-016-0564-8.
"Breathing Limited Air Situational Training Masks (BlastMask) Versus SelfContained Breathing Apparatus (SCBA) for Firefighters: A Pilot Study", By Thomas L. Andre et al., Published at International journal of exercise science, Published in [2019] https://digitalcommons.wku.edu/cgi/viewcontent.cgi?article=2498&context=ijes.
"Internet of Things technology for fire monitoring system", By S.R.Vijayalakshmi et al., Published at international Research Journal of Engineering and Technology (IRJET), Published on [Jun. 6, 2017] https://www.irjet.net/archives/V4/16/IRJET-V416418.pdf.
"Firefighter Safety Using IoT", By Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.
"A smart fire detection system using IoT technology with automatic water sprinkler", By Hamood Alqourabah et al., Published at International Journal of Electrical and Computer Engineering (IJECE), Published on [Mar. 5, 2021] https://pdfs.semanticscholar.org/f3e7/a7c0cf2d448be592421045033506e845e6c2.pdf.
"Route Planning for Fire Rescue Operations in Long-Term Care Facilities Using Ontology and Building Information Models", By Ru-Guan Wang et al., Published at Building Information Modelling. Semantic Web and Internet-of-Things for Smart Cities, Published on [Jul. 21, 2022] https://www.mdpi.com/2075-5309/12/7/1060?type=check_update&version=2.

METHOD AND SYSTEM OF AIR/ENVIRONMENTAL PARAMETER BASED AUTOMATIC CLOSING OF ONE OR MORE VALVES TO ISOLATE BREATHABLE AIR SUPPLIED TO ONE OR MORE LEVELS OF A STRUCTURE HAVING A FIREFIGHTER AIR REPLENISHMENT SYSTEM IMPLEMENTED THEREIN

CLAIM OF PRIORITY

This Application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, U.S. Provisional Patent Application No. 63/427,851 titled AUTOMATED PURGING OF BREATHABLE AIR INSIDE BREATHABLE AIR PIPING UPON CONFIRMATION OF AN ALERT STATUS BY A REMOTE CERTIFICATION LABORATORY ANALYZING AIR QUALITY MARKER DATA CAPTURED USING SENSORS ASSOCIATED WITH A CONTINUAL AIR QUALITY ANALYZER COUPLED WITHIN A FIREFIGHTER AIR REPLENISHMENT SYSTEM filed on Nov. 24, 2022, U.S. Provisional Patent Application No. 63/357,743 titled CONTINUAL AIR QUALITY MONITORING THROUGH LOCALIZED ANALYSIS OF BREATHABLE AIR THROUGH A SENSOR ARRAY filed on Jul. 1, 2022, U.S. Provisional Patent Application No. 63/357,754 titled ON-DEMAND CERTIFICATION THROUGH COMMUNICATION OF ASSOCIATED AIR-QUALITY MARKER DATA TO A REMOTE CERTIFICATION LABORATORY filed on Jul. 1, 2022, U.S. Provisional Patent Application No. 63/359,882 titled REMOTE MONITORING AND CONTROL OF A FIREFIGHTER AIR REPLENISHMENT SYSTEM THROUGH SENSORS DISTRIBUTED WITHIN COMPONENTS OF THE FIREFIGHTER AIR REPLENISHMENT SYSTEM filed on Jul. 11, 2022, U.S. Provisional Patent Application No. 63/427,849 titled AUTOMATIC CLOSURE OF A VALVE IN A BUILDING STRUCTURE TO ISOLATE BREATHABLE AIR SURROUNDING COMPROMISED FLOORS BASED ON SENSORY CAPTURE OF AMBIENT CONDITIONS AROUND FILL PANELS OF A FIREFIGHTER AIR REPLENISHMENT SYSTEM DURING AN EMERGENCY USING A MACHINE LEARNING ALGORITHM OR RESPONSIVE TO A CONTROLLER STATE CHANGE filed on Nov. 24, 2022, and U.S. Provisional Patent Application No. 63/427,850 titled AUTOMATED BYPASS OF STORED BREATHABLE AIR BASED UPON CONFIRMATION OF AN ALERT STATUS BY A REMOTE CERTIFICATION LABORATORY ANALYZING AIR QUALITY MARKER DATA CAPTURED USING SENSORS ASSOCIATED WITH A CONTINUAL AIR QUALITY ANALYZER COUPLED WITHIN A FIREFIGHTER AIR REPLENISHMENT SYSTEM filed on Nov. 24, 2022

The contents of each of the aforementioned applications are incorporated herein by reference in entirety thereof.

FIELD OF TECHNOLOGY

This disclosure relates generally to emergency systems and, more particularly, to methods and/or a system of air/environmental parameter based automatic closing of one or more valves to isolate breathable air supplied to one or more levels of a structure having a safety system implemented therein.

BACKGROUND

A structure (e.g., a vertical building, a horizontal building, a tunnel, marine craft, a mine) may have a Firefighter Air Replenishment System (FARS) implemented therein. The FARS may be employed to provide pure and safe breathable air to emergency personnel and/or maintenance personnel associated therewith. The structure may have multiple levels (e.g., floor levels) thereof and the breathable air may be supplied across the FARS implemented within the structure including the multiple levels via a fixed piping system implemented therein. During an emergency situation such as a fire, smoke, leakage of the breathable air at one or more levels and/or contamination of the breathable air at the one or more levels, the breathable air supplied to the other levels may also become contaminated. Further, as the access of the breathable air at the one or more levels is rendered impossible due to the emergency situation, the continued supply of the breathable air to the one or more levels may prove to be wasteful.

SUMMARY

Disclosed are methods and/or a system of air/environmental parameter based automatic closing of one or more valves to isolate breathable air supplied to one or more levels of a structure having a safety system implemented therein.

In one aspect, a method of a safety system of a structure having a number of levels and a fixed piping system installed therewithin to supply breathable air from a source across the safety system including the number of levels is disclosed. The method includes sensing a parameter of an environment of one or more level(s) of the number of levels of the structure and/or the breathable air supplied thereto. The method also includes, in response to the sensing, automatically closing one or more valve(s) associated with control of the supply of the breathable air to the one or more level(s) to isolate the breathable air supplied to the one or more level(s).

In another aspect, a method of a safety system of a structure having a number of levels and a fixed piping system installed therewithin to supply breathable air from a source across the safety system including the number of levels is disclosed. The method includes sensing a parameter of an environment of one or more level(s) of the number of levels of the structure and/or the breathable air supplied thereto. The method also includes, in response to determining that the parameter is outside a predetermined threshold value thereof based on the sensing, automatically closing one or more valve(s) associated with control of the supply of the breathable air to the one or more level(s) to isolate the breathable air supplied to the one or more level(s).

In yet another aspect, a safety system of a structure having a number of levels is disclosed. The safety system includes a source of breathable air, and a fixed piping system installed within the structure for supply of the breathable air from the source across the safety system including the number of levels. The safety system also includes one or more component(s) including one or more sensor(s) associated therewith to sense a parameter of an environment of one or more level(s) of the number of levels and/or the breathable air supplied thereto, and, in response to the sensing, to automatically close one or more valve(s) associated with control of the supply of the breathable air to the one or more level(s) to isolate the breathable air supplied to the one or more level(s).

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide methods and/or a system of air/environmental parameter based automatic closing of one or more valves to isolate breathable air supplied to one or more levels of a structure having a safety system implemented therein. Although the present embodiments have been described with reference to specific example embodiments, it will be evident that various modifications and changes may be made to these embodiments without departing from the broader spirit and scope of the various embodiments.

Figure 1A:
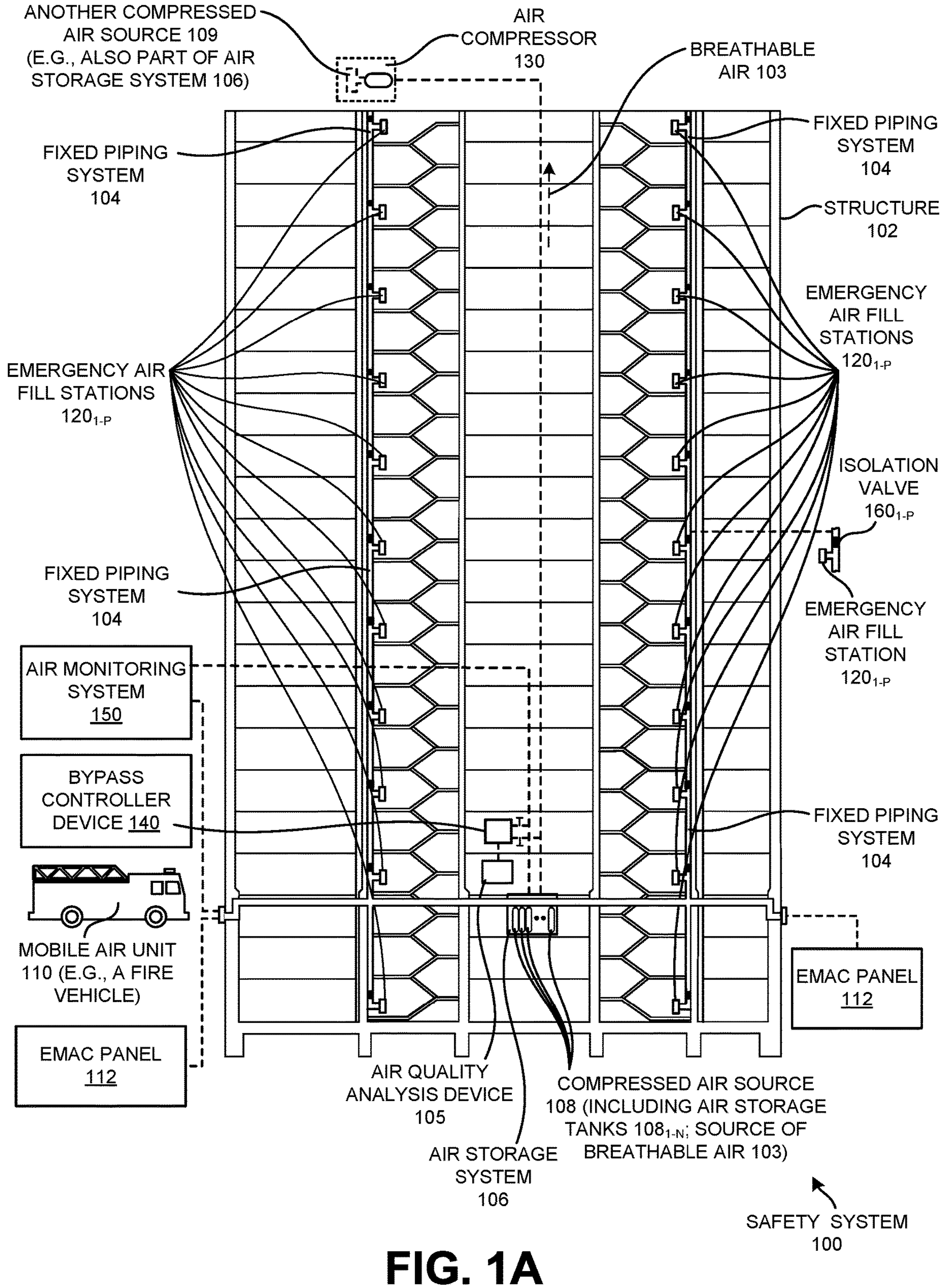
FIG. 1A is a schematic and an illustrative view of a safety system associated with a structure, according to one or more embodiments.

FIG. 1A shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1A, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks $\mathbf{108}_{1\text{-}N}$ that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1A, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1A shows air monitoring system 150 as communicatively coupled to air storage system 106 and EMAC panel 112 merely for the sake of example. It should be noted that EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations $\mathbf{120}_{1\text{-}P}$ within structure 102. In one example implementation, each emergency air fill station $\mathbf{120}_{1\text{-}P}$ may be located at a specific level of structure 102. If structure 102 is regarded as a vertical building structure, an emergency air fill station $\mathbf{120}_{1\text{-}P}$ may be located at each of a basement level, a first floor level, a second floor level and so on. For example, emergency air fill station $\mathbf{120}_{1\text{-}P}$ may be located at the end of the flight of stairs that emergency fighting personnel (e.g., firefighting personnel) need to climb to reach a specific floor level within the vertical building structure.

In one or more embodiments, an emergency air fill station $\mathbf{120}_{1\text{-}P}$ may be a static location within a level of structure 102 that provides emergency personnel 122 (e.g., firefighters, emergency responders) with the ability to rapidly fill air bottles/cylinders (e.g., SCBA cylinders). In one or more embodiments, emergency air fill station $\mathbf{120}_{1\text{-}P}$ may be an emergency air fill panel or a rupture containment air fill station. In one or more embodiments, proximate each emergency air fill station $\mathbf{120}_{1\text{-}P}$, safety system 100 may include an isolation valve $\mathbf{160}_{1\text{-}P}$ to isolate a corresponding emergency air fill station $\mathbf{120}_{1\text{-}P}$ from a rest of safety system 100. For example, said isolation may be achieved through the manual turning of isolation valve $\mathbf{160}_{1\text{-}P}$ proximate the corresponding emergency air fill station $\mathbf{120}_{1\text{-}P}$ or remotely (e.g., based on automatic turning) from air monitoring system 150. In one example implementation, air monitoring system 150 may maintain breathable air supply to a subset of emergency air fill stations $\mathbf{120}_{1\text{-}P}$ through control of a corresponding subset of isolation valves $\mathbf{160}_{1\text{-}P}$ and may isolate the other emergency air fill stations $\mathbf{120}_{1\text{-}P}$ from the breathable air supply. Thus, in one or more embodiments, isolation valves $\mathbf{160}_{1\text{-}P}$ may be employed to control the supply of breathable air 103 to the corresponding emergency air fill stations $\mathbf{120}_{1\text{-}P}$ (associated with levels of structure 102). It should be noted that configurations and components of safety system 100 may vary from the example safety system 100 of FIG. 1A.

Figure 1B:
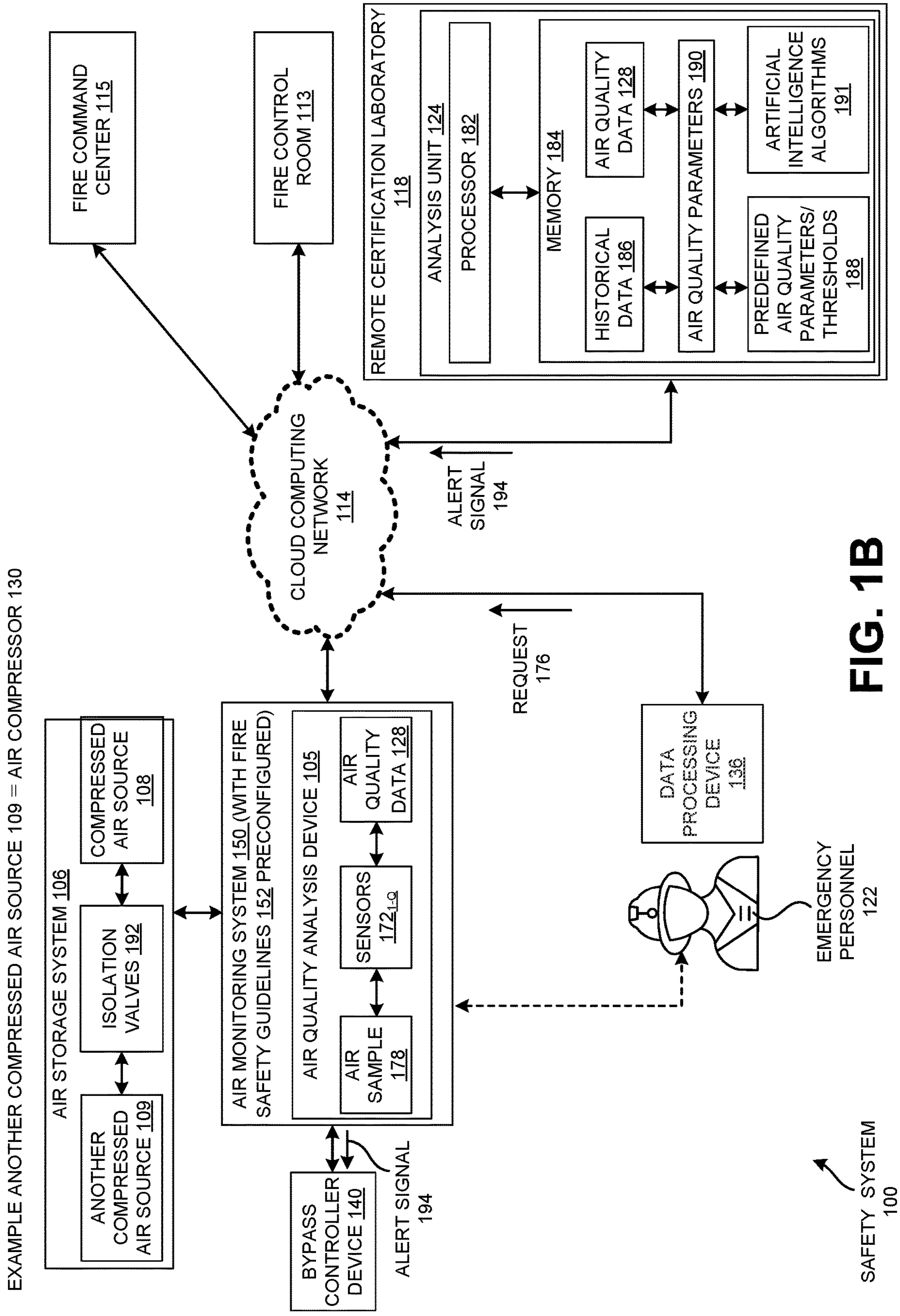
FIG. 1B is a schematic view of the safety system of FIG. 1A integrated with and/or including other components, according to one or more embodiments.

FIG. 1B shows safety system 100 of FIG. 1A integrated with and/or including other components, according to one or more embodiments. In one or more embodiments, safety system 100 shows air storage system 106 discussed above as including air storage tanks $\mathbf{108}_{1\text{-}N}$ (example pressurized/compressed air source shown as compressed air source 108) and air compressor 130. In some embodiments, air compressor 130 may be regarded as another compressed air source 109 internal to or external to structure 102, as will be discussed below. In one or more embodiments, air monitoring system 150 discussed above may include an air quality analysis device 105 (e.g., a programmable electromechanical device) to determine quality of breathable air 103 within safety system 100. In order to do this, in one or more embodiments, air quality analysis device 105 may be communicatively coupled to air storage system 106.

In one or more embodiments, air quality analysis device 105 may continuously and/or intermittently measure and analyze components of breathable air 103 within safety system 100. Further, in one or more embodiments, air quality analysis device 105 may compare the results of the analyses to standard fire safety guidelines 152 pertaining to the breathable air (e.g., breathable air 103) programmed therewithin, as shown in FIG. 1B. Alternatively or additionally, in some embodiments, standard fire safety guidelines 152 may exist on an external device (e.g., data processing device 136 to be discussed below/server) and accessed through air quality analysis device 105.

In one or more embodiments, air quality analysis device 105 may include a set of sensors $\mathbf{172}_{1\text{-}Q}$ to monitor parameters associated with quality of breathable air 103 and components thereof within safety system 100. In one or more embodiments, sensors $\mathbf{172}_{1\text{-}Q}$ may continuously (and automatically be programmed to) monitor the quality of breathable air 103 from air storage system 106 that is being supplied to the various emergency air fill stations $\mathbf{120}_{1\text{-}P}$ within structure 102. In one or more embodiments, once a deviation in an air parameter (e.g., temperature, pressure, contamination, carbon monoxide component, carbon dioxide component etc.) is detected by sensors $\mathbf{172}_{1\text{-}Q}$, air quality analysis device 105 may automatically activate a bypass controller device 140 (e.g., another programmable/controllable electromechanical device) to automatically switch off supply of breathable air 103 from compressed air source 108.

For example, bypass controller device 140 may control isolation valves $\mathbf{160}_{1\text{-}P}$ associated with emergency air fill stations $\mathbf{120}_{1\text{-}P}$ to automatically bypass compressed air source 108 (e.g., air storage tanks $\mathbf{108}_{1\text{-}N}$) with respect to breathable air 103 within safety system 100; appropriate control (e.g., closing) of isolation valves $\mathbf{160}_{1\text{-}P}$ may shut down breathable air 103 from compressed air source 108 to emergency air fill stations $\mathbf{120}_{1\text{-}P}$. Further, in response to the automatic bypass of compressed air source 108, bypass controller device 140 may automatically connect emergency air fill stations $\mathbf{120}_{1\text{-}P}$ to another compressed air source 109 of air storage system 106 as the source of breathable air 103 within safety system 100. Here, in one or more embodiments, isolation valves $160_{1-P}$ may, again, be controlled to be, for example, opened to let another compressed air source 109 supply breathable air 103 within safety system 100. Thus, in one or more embodiments, the automatic switching between compressed air sources within safety system 100 may be accomplished through sensing/monitoring of parameters of breathable air 103 therewithin; such a switch may ensure a continuous, uninterrupted supply of breathable air 103 within safety system 100.

In one or more embodiments, the automatic switching between compressed air sources within safety system 100 may occur based on controlling isolation valves 192 associated with compressed air source 108 and another compressed air source 109 within air storage system 106. For example, automatic closing of an isolation valve 192 associated with compressed air source 108 within air storage system 106 and automatic opening of another isolation valve 192 associated with another compressed air source 109 based on detection of deviation in parameters of components of breathable air 103 may result in the automatic switching between compressed air sources within safety system 100. Another compressed air source 109 (e.g., air compressor 130) may be internal to structure 102 or external (e.g., mobile air unit 110 connected to safety system 100 through EMAC panel 112) thereto.

In one or more embodiments, emergency personnel 122 (e.g., firefighters, emergency responders, maintenance personnel, control room personnel) at data processing device 136 (e.g., a mobile phone, a tablet, a server, a laptop, a computing device) may request one or more air quality tests on breathable air 103 through air quality analysis device 105. In one or more embodiments, said request 176 may activate (e.g., automatically) air quality analysis device 105 to obtain an air sample 178 of breathable air 103. For example, air quality analysis device 105 may allow a predetermined quantity/volume of breathable air 103 pass through a chamber (not shown) thereof to enable air sample 178 to be procured for said one or more quality tests. Alternatively or additionally, air quality analysis device 105 may allow breathable air 103 to pass through the chamber for a predetermined duration to enable air sample 178 to be procured for the one or more quality tests.

Figure 2:
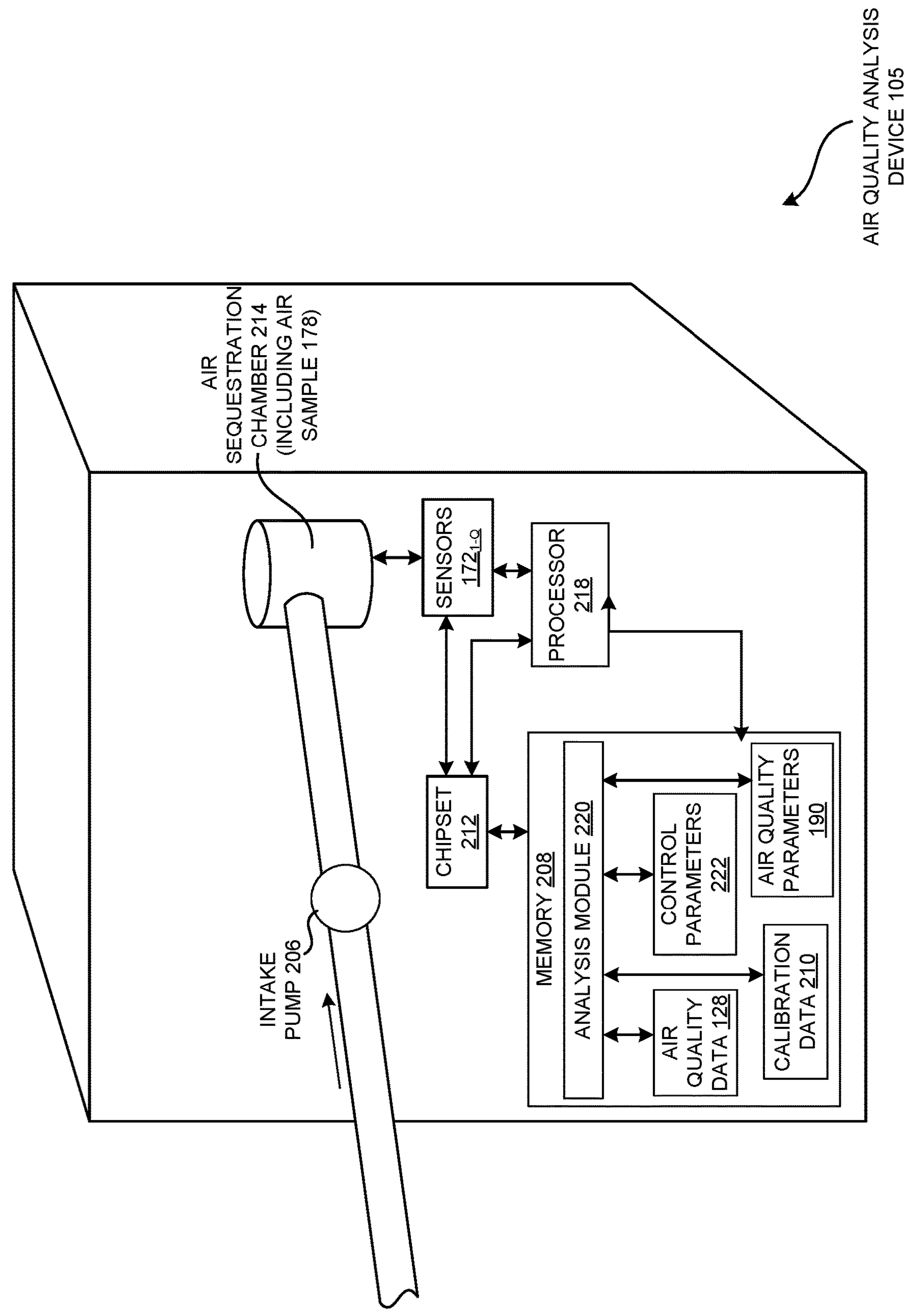
FIG. 2 is a schematic view of an air quality analysis device of the safety system of FIGS. 1A-B, according to one or more embodiments.

FIG. 2 shows air quality analysis device 105, according to one or more embodiments. In some embodiments, air quality analysis device 105 may be integrated with fixed piping system 104 to be along the path of flow of breathable air 103. In other embodiments, air quality analysis device 105 may be part of air monitoring device 150 or even air storage system 106. In some other embodiments, air quality analysis device 105 may merely be along a flow path of breathable air 103 of safety system 100. In one or more embodiments, air quality analysis device 105 may include an intake pump 206 to ingest a quantity/volume of breathable air 103 through fixed piping system 104 into an air sequestration chamber 214, thereby segregating air sample 178 of breathable air 103 for analysis. In one or more embodiments, air sequestration chamber 214 may be communicatively coupled to sensors $172_{1-Q}$ that analyze air sample 178 therewithin and perform operations and functionalities related to monitoring and/or sensing parameters related to air quality and components of breathable air 103 within safety system 100.

In one or more embodiments, a chipset 212 coupled to a memory 208 (e.g., a volatile and/or a non-volatile memory) may, in turn, be electrically coupled to sensors $172_{1-Q}$ to convert results of the sensing and/or monitoring into machine (e.g., a data processing device such as data processing device 136) readable/interpretatable air quality data 128 (e.g., stored in memory 208); said air quality data 128 may be communicable to a remote certification laboratory 118 (referring back to FIG. 1B) through a computing network (e.g., cloud computing network 114). Thus, in one or more embodiments, analysis and/or certification of breathable air 103 through safety system 100 by professionals may be enabled through safety system 100. As shown in FIG. 2, memory 208 and chipset 212 may be communicatively coupled to a processor 218 (e.g., a microcontroller) that executes instructions associated with the abovementioned operations and/or functionalities. For this purpose, in one or more embodiments, memory 208 may include instructions associated with an analysis module 220 stored therein that are executable through processor 218.

In one or more embodiments, remote certification laboratory 118 may analyze air quality data 128 of air sample 178 and automatically generate an alert signal 194 to activate bypass controller device 140 if anomalies (e.g., due to air contamination, particulates, pollutants, etc.) and/or faults (e.g., deviation from predefined parameters such as temperature, pressure, a proportion of air components, etc.) are detected in air quality data 128. In one or more embodiments, for the aforementioned purpose, bypass controller device 140 may automatically generate signals to control isolation valves $160_{1-P}$/isolation valves 192, as discussed above. In addition, in one or more embodiments, air quality data 128 may be communicated to a fire command center 115 (e.g., a remote center with data processing capabilities), a fire control room 113 (e.g., a control room internal to or external to structure 102) and/or emergency personnel 122 at data processing device 136 through cloud computing network 114.

In one or more embodiments, remote certification laboratory 118 alone may not generate alert signal 194. In one or more embodiments, based on monitoring and/or sensing of breathable air 103 and components thereof through air quality analysis device 105 as discussed above, alert signal 194 may be directly generated through air quality analysis device 105, for example, based on an alert system (not shown) implemented therein. As discussed above, in accordance therewith, bypass controller device 140 coupled to air monitoring system 150 may generate signals to automatically bypass air storage system 106 (e.g., compressed air source 108) with respect to supply of breathable air 103 within safety system 100 and/or automatically switch between compressed air sources (e.g., between compressed air source 108 and another compressed air source 109 and/or vice versa).

In one or more embodiments, air quality analysis device 105 may be permanently affixed (or, along a path of breathable air 103 within fixed piping system 104) to fixed piping system 104 to avoid logistical issues related to building an analogous sensing/monitoring mechanism offsite, and/or to reduce the risk of breathing contaminated air causing harm to emergency personnel 122 during an emergency (e.g., air contamination, air pollution, fire, smoke).

In one or more embodiments, as shown in FIG. 2, memory 208 of air quality analysis device 105 may include known calibration data 210 stored therein that is used by processor 218 (e.g., by analysis module 220) to compare a characteristic/parameter of breathable air 103 therewith based on results of analysis through remote certification laboratory 118 and/or air quality analysis device 105. In one or more embodiments, in response to determining through processor 218 that the characteristic/parameter is dissimilar to one or more of known calibration data 210, control parameters 222

(e.g., stored in memory 208) of air quality analysis device 105 may be adjusted to account for said dissimilarities. Also, in one or more embodiments, air quality analysis device 105 may include appropriate circuitry to receive instructions from fire command center 115, fire control room 113 and/or data processing device 136 (emergency personnel 122) to mark/alert safety system 100 for transitioning thereof into an emergency state and/or generate trigger signals to activate bypass controller device 140 for automatic bypass of air storage system 106/compressed air source 108/another compressed air source 109 discussed above. Again, in one or more embodiments, the same functionalities may be provided to air quality analysis device 105 itself.

In one or more embodiments, as shown in FIG. 1B, remote certification laboratory 118 may include an analysis unit 124 (e.g., a data processing device such as a server) including a processor 182 (e.g., a processor core, a network of processors, a processor) communicatively coupled to a memory 184 (e.g., a volatile and/or a non-volatile memory and/or a database). In one or more embodiments, memory 184 may have historical data 186 (e.g., relevant to safety system 100 and breathable air 103 therein) and predefined air quality parameters/thresholds 188 (e.g., as per National Fire Protection Association (NFPA) standards, as per general and/or custom safety standards) for breathable air 103. In one or more embodiments, analysis unit 124 may measure air quality parameters 190 (also shown as part of memory 208 of air quality analysis device 105 to account for air quality analysis device 105 performing operations analogous to analysis unit 124 including triggering bypass controller device 140 to automatic bypass air storage system 106/compressed air source 108/another compressed air source 109 discussed above) using air quality data 128. In some embodiments, analysis unit 124 may execute one or more artificial intelligence algorithms 191 (e.g., stored in memory 184 and executable through processor 182) for advanced profiling and/or testing of breathable air 103 through safety system 100.

In some embodiments, the profiling and/or testing through analysis unit 124 of remote certification laboratory 118 may provide for accreditation of air quality of breathable air 103 within safety system 100 when the results of the profiling/testing yield that air quality parameters 190 are within the predefined air quality parameters/thresholds 188; the aforementioned accreditation may be provided in the form of a certificate to fire command center 115, fire control room 113 and/or data processing device 136 (emergency personnel 122). In some embodiments, each time safety system 100 is certified, the corresponding certification generated may be written permanently into a distributed ledger and/or a blockchain (e.g., Ethereum™ blockchain, Solana™ blockchain; part of memory 184 or a cloud version thereof) for redundant and secondary record-keeping. In addition, advanced reporting, analytics, control and/or test functions may be enabled through a mobile and/or a desktop application (e.g., executing on data processing device 136).

In one or more embodiments, when the results of the profiling/testing yield that air quality parameters 190 are not within predefined air quality parameters/thresholds 188, remote certification laboratory 118/analysis unit 124 may generate alert signal 194 to notify fire command center 115, fire control room 113 and/or data processing device 136 (emergency personnel 122) of an emergency state of safety system 100. In some implementations, alert signal 194 may automatically activate bypass controller device 140 to switch off supply of breathable air 103 from compressed air source 108/another compressed air source 109/air storage system 106 and, thereby, isolate compressed air source 108/another compressed air source 109/air storage system 106 from safety system 100. Alert signal 194 additionally may activate bypass controller device 140 to automatically connect a different compressed air source (e.g., another compressed air source 109) to safety system 100/emergency air fill stations $\mathbf{120}_{1\text{-}P}$ to ensure a continuous supply of breathable air 103 within safety system 100, according to one or more embodiments.

Figure 3:
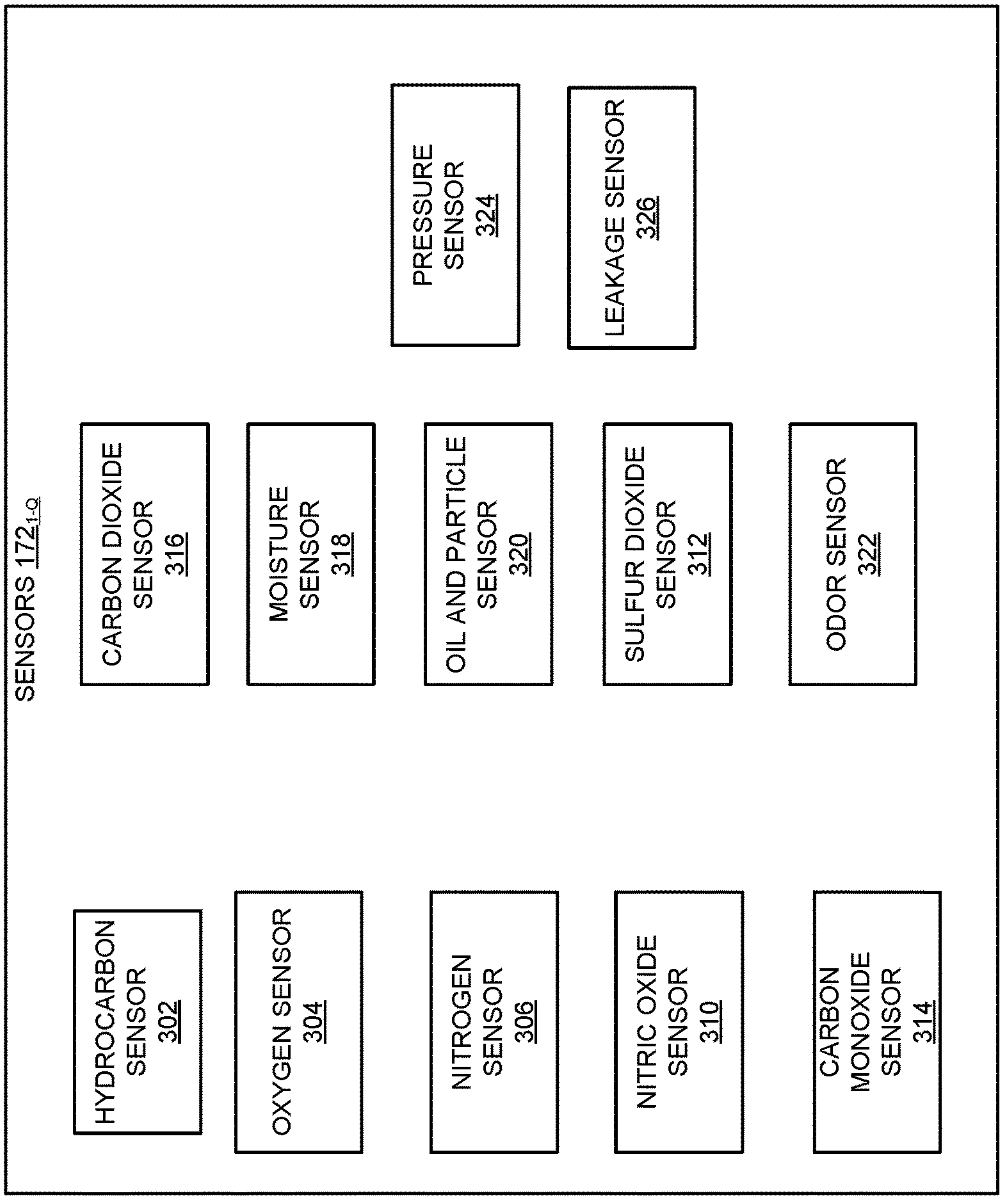
FIG. 3 is a schematic view of example constituent sensors within the air quality analysis device of FIGS. 1A-B and FIG. 2.

FIG. 3 shows constituent sensors of sensors $\mathbf{172}_{1\text{-}Q}$, according to one or more embodiments. In one or more embodiments, sensors $\mathbf{172}_{1\text{-}Q}$ may include a hydrocarbon sensor 302 to measure a hydrocarbon level to an accuracy of, say, 0.02-0.3% absolute, an oxygen sensor 304 to measure an oxygen level to an accuracy of, say, 0.1% absolute, a nitrogen sensor 306, a nitric oxide sensor 310, a carbon monoxide sensor 314, a carbon dioxide sensor 316, a moisture sensor 318, an oil and particle sensor 320 to measure a level of oil and/or particle to an accuracy of, say, ±2% relative, a sulfur dioxide sensor 312, a pressure sensor 324, an odor sensor 322 and/or a leakage sensor 326. In one or more embodiments, the automatic bypassing of air storage system 106/compressed air source 106/another compressed air source 109 through bypass controller device 140 may be initiated when one or more of the following conditions are detected through the corresponding sensors $\mathbf{172}_{1\text{-}Q}$:

1. carbon monoxide sensor 314 detects a level of carbon monoxide in breathable air 103 in excess of a first predetermined threshold value (e.g., 4.5 parts per million; part of predefined air quality parameters/thresholds 188 shown as stored in both memory 184 and memory 208),
2. carbon dioxide sensor 316 detects a level of carbon dioxide in breathable air 103 in excess of a second predetermined threshold value (e.g., 1,000 parts per million; part of predefined air quality parameters/thresholds 188),
3. oxygen sensor 304 detects a level of oxygen in breathable air 103 outside a predetermined range of values (e.g., between 19.5% and 23.5; part of predefined air quality parameters/thresholds 188),
4. nitrogen sensor 306 detects a level of nitrogen in breathable air 103 less than a third predetermined threshold value (e.g., below 75%; part of predefined air quality parameters/thresholds 188) and/or in excess of a fourth predetermined threshold value (e.g., above 81%; part of predefined air quality parameters/thresholds 188),
5. hydrocarbon sensor 302 detects a condensed hydrocarbon content in breathable air 103 in excess of a fifth predetermined threshold value (e.g., 5 milligrams per cubic meter of breathable air 103; part of predefined air quality parameters/thresholds 188),
6. moisture sensor 318 detects a moisture concentration in breathable air 103 in excess of a sixth predetermined threshold value (e.g., 24 parts per million by volume; part of predefined air quality parameters/thresholds 188), and
7. pressure sensor 324 detects a pressure of breathable air 103 less than a seventh predetermined threshold value (e.g., below 90% of a maintenance pressure specified in a fire code; part of predefined air quality parameters/thresholds 188).

Other types of sensors that are part of sensors $\mathbf{172}_{1\text{-}Q}$ have analogous predetermined threshold values/ranges (e.g., part of predefined air quality parameters/thresholds 188) associated with air quality parameters 190 sensed therethrough;

such sensors $172_{1-Q}$ are shown in FIG. 3 and are self-explanatory. It should be noted that parameters sensed through sensors $172_{1-Q}$ may not be limited to air quality parameters 190; even characteristics such as pressure (e.g., through pressure sensor 324) may be sensed through sensors $172_{1-Q}$. Also, in one or more embodiments, leakage of breathable air 103 from safety system 100 (e.g., fixed piping system 104, at emergency air fill stations $120_{1-P}$, isolation valves $160_{1-P}$, air storage system 106 such as compressed air source 108/air storage tanks $108_{1-N}$/another compressed air source 109) may also be sensed through appropriate sensors $172_{1-Q}$ (e.g., leakage sensor 326). In one example implementation, leakage sensor 326 may be an ultrasound sensor that senses high sound frequencies of leaks of breathable air 103. Said leaks, if not addressed appropriately, may result in catastrophic loss of breathable air 103 from safety system 100. In one or more embodiments, once sensors $172_{1-Q}$ detect the leakage of breathable air 103, again, bypass controller device 140 may automatically be triggered to bypass air storage system 106/compressed air source 108/ another compressed air source 109, as discussed above.

Thus, in one or more embodiments, the capabilities of air quality analysis device 105 and/or remote certification laboratory 118 may be extended to accommodate detection of parameters such as pressure and leakage of breathable air 103. All reasonable variations are within the scope of the exemplary embodiments discussed herein.

Figure 4:
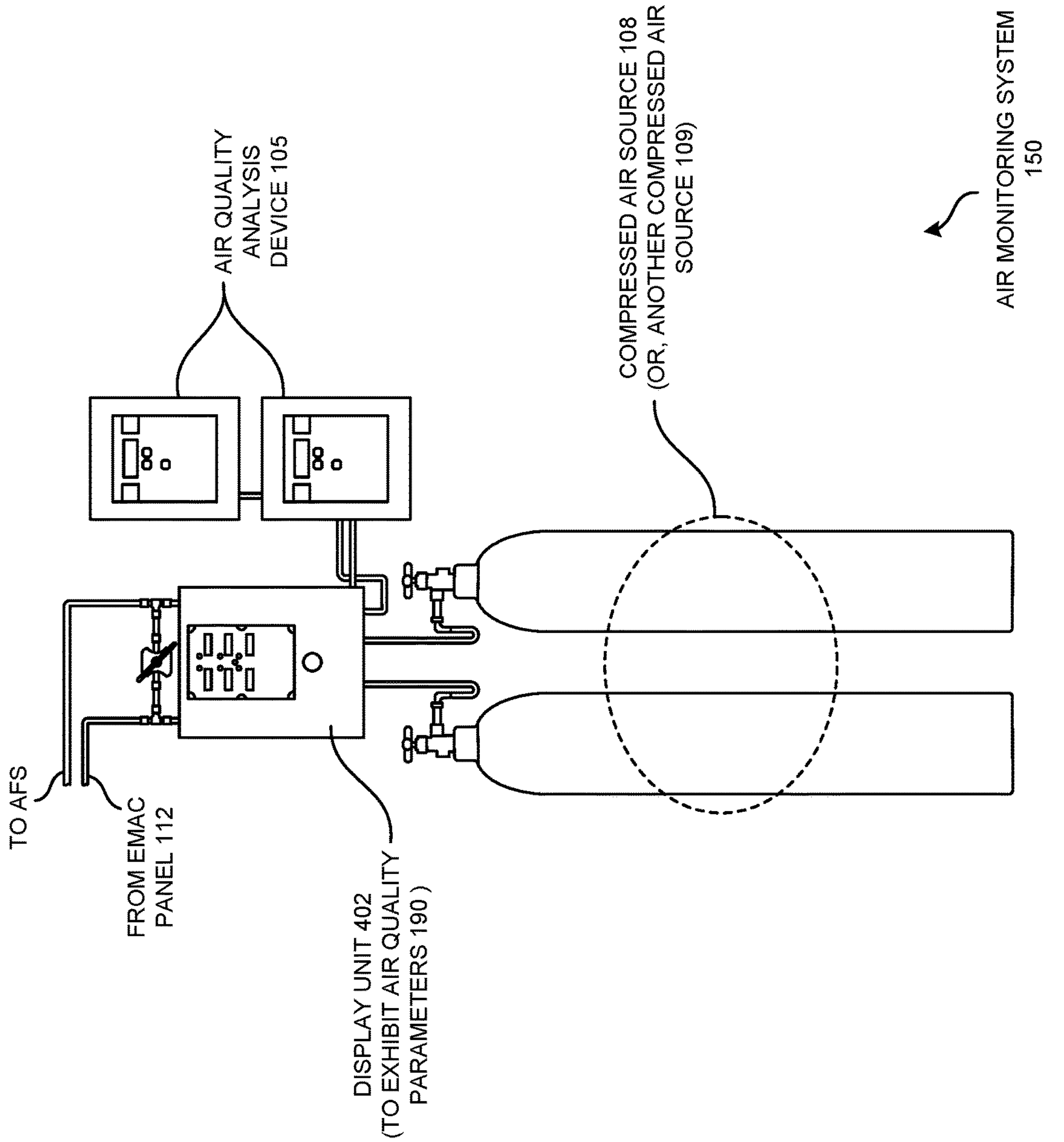
FIG. 4 is a schematic and an illustrative view of an example air monitoring system of the safety system of FIGS. 1A-B.

FIG. 4 shows air monitoring system 150 discussed above in an example implementation form. Here, air monitoring system 150 may be a collection of units and/or components put together to check and record quality (and/or pressure/ leakage) of breathable air 103 and components thereof within safety system 100. Air quality analysis device 105 may include a display unit 402 associated therewith (e.g., part of or external to air quality analysis device 105). to exhibit air quality parameters 190 captured and/or analyzed through air quality analysis device 105. Display unit 402 may be part of an Android™-based data processing device (e.g., a tablet, a notebook) with a touchscreen for visual presentation of air quality parameters 190.

Display unit 402, as discussed herein, may be an electromechanical device installed at key locations of structure 102, and air quality analysis device 105 may be made of one or more material(s) having fire-rated capabilities. A video camera (not shown) installed on or integrated with display unit 402 may capture visual incidents at the key locations that are accessible at fire command center 115, fire control room 113 and/or data processing device 136 through cloud computing network 114. Air quality parameters 190 may be monitored in accordance with standard fire safety guidelines (e.g., NFPA guidelines, Occupational Safety and Health Administration (OSHA) and/or Compressed Gas Association (CGA) standards).

Figure 5:
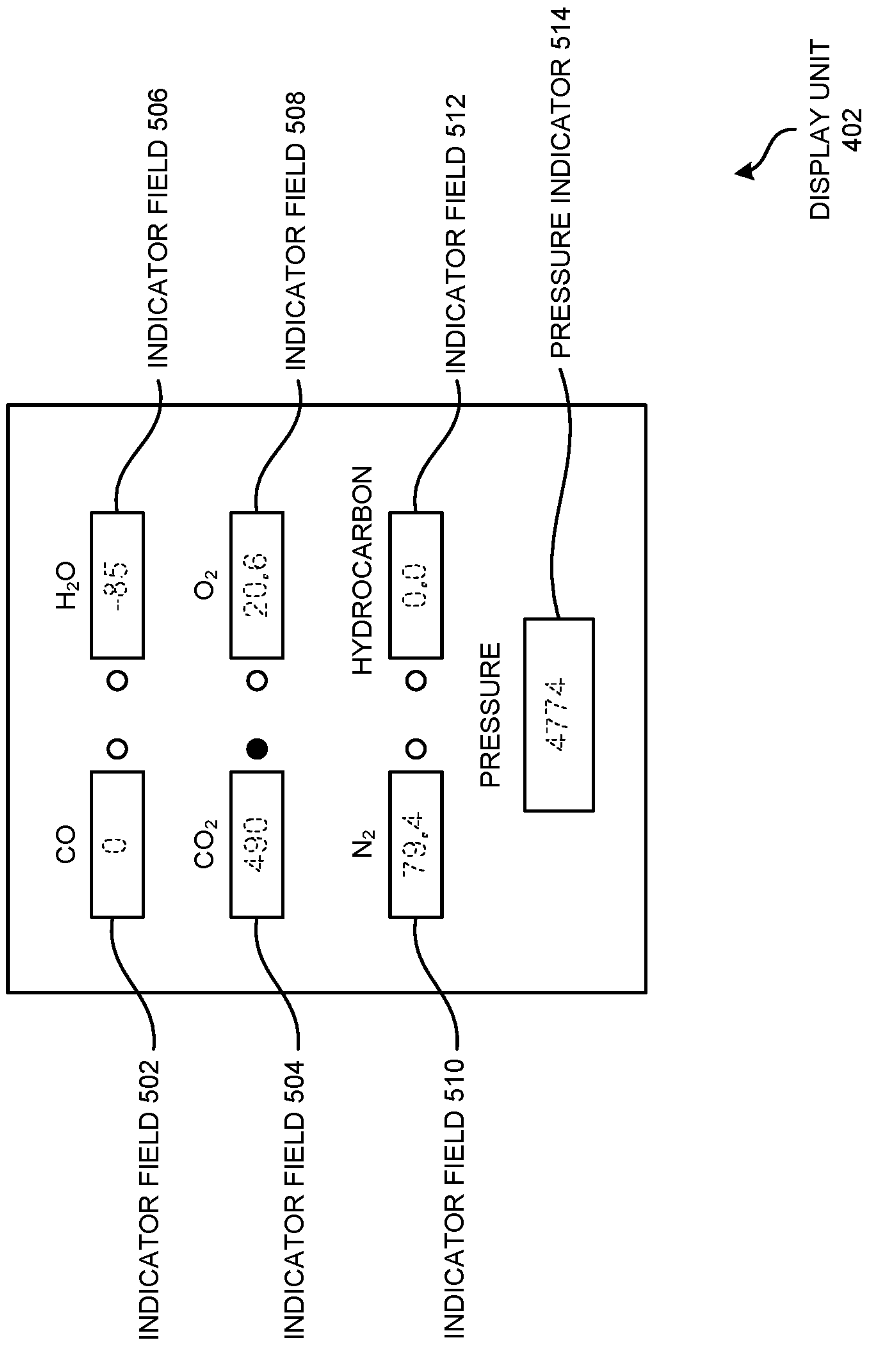
FIG. 5 is a schematic and an illustrative view of an example display unit associated with the air quality analysis device of the air monitoring system of FIG. 4.

FIG. 5 shows an example display unit 402 associated with air quality analysis device 105 of FIG. 4. Display unit 402 may include various indicator fields to exhibit air quality parameters 190 captured and/or analyzed by air quality analysis device 105 in real-time. For example, indicator field 502 may be associated with carbon monoxide content in breathable air 103 (e.g., from air storage system 106/compressed air source 108), indicator field 504 may be associated with carbon dioxide content n breathable air 103, indicator field 510 may be associated with nitrogen content in breathable air 103, indicator field 506 may be associated with moisture content in breathable air 103, indicator field 508 may be associated with oxygen content in breathable air 103, and indicator field 512 may be associated with hydrocarbon content in breathable air 103. In addition, display unit 402 may include a pressure indicator 514 to exhibit air pressure of breathable air 103 (e.g., air sample 178).

Further, display unit 402 may include indicator lights (not shown) to indicate changes in air quality parameters 190. through changes in colors of lights emitted therefrom. Still further, display unit 402 may include, for example, a Quick Response (QR) scanner (not shown) to enable emergency personnel 122 to scan and check statuses of air quality parameters 190.

Figure 6:
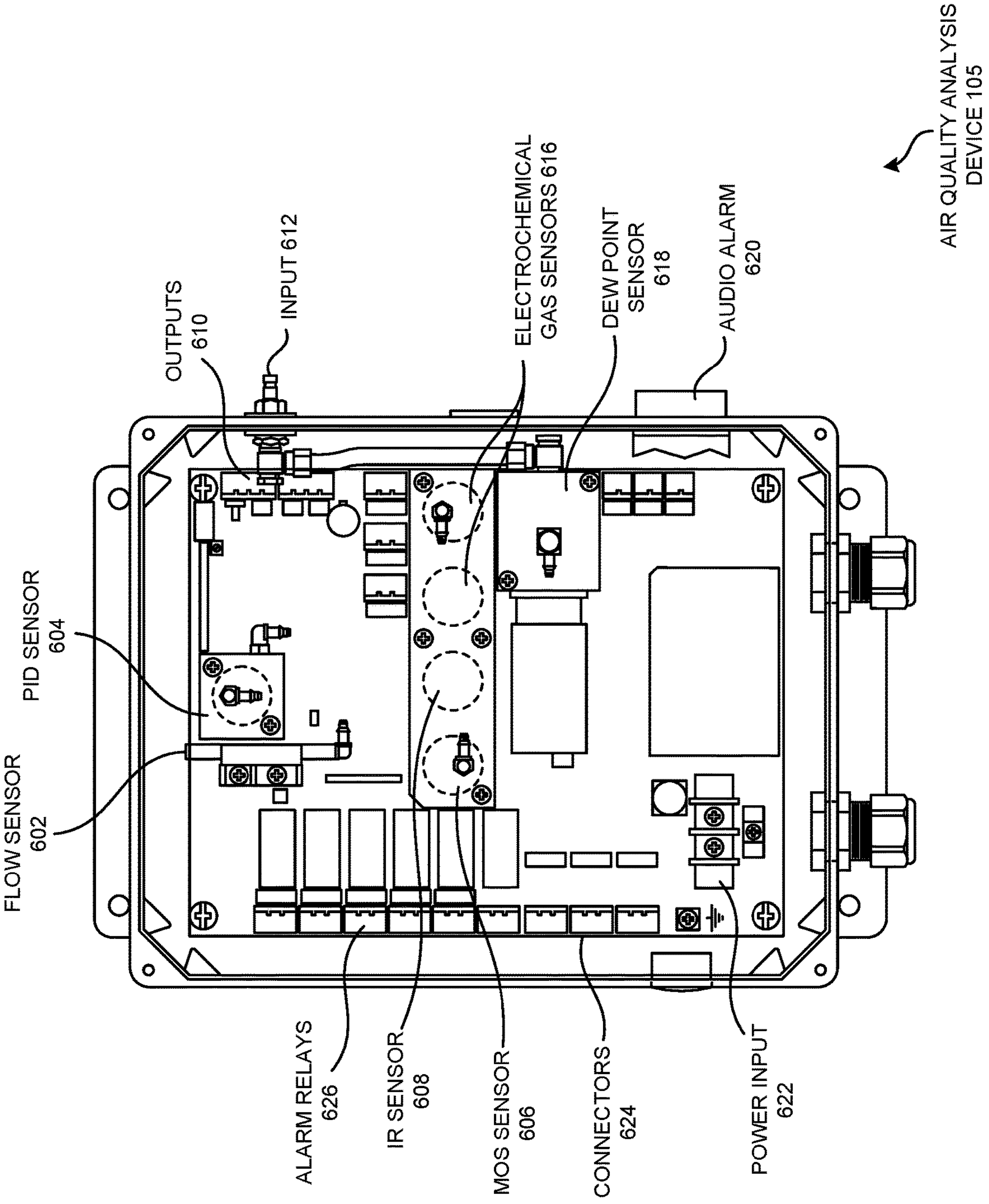
FIG. 6 is a schematic and an illustrative view of an example air quality analysis device of the safety system of FIGS. 1A-B.

FIG. 6 shows an example air quality analysis device 105. Air quality analysis device 105 may include a flow sensor 602 (e.g., an electronic device) that measures and/or regulates a flow rate of breathable air 103 (e.g., from compressed air source 108, another compressed air source 109) within fixed piping system 104. A photoionization detector (PID) sensor 604 of air quality analysis device 105 may detect low concentrations of volatile organic compounds (VOCs)/hazardous substances in breathable air 103. In one example implementation, PID sensor 604 may utilize ultraviolet (UV) light to break down said VOCs in breathable air 103 into positive and negative ions following which a charge of the ionized gas as a function of concentration of the VOCs in breathable air 103 is detected and/or measured.

A Metal Oxide Semiconductor (MOS) sensor 606 of air quality analysis device 105 may detect concentrations of various types of gases in breathable air 103/air sample 178 by measuring a change in resistance of a metal oxide due to adsorption of gases in breathable air 103/air sample 178. An infrared (IR) sensor 608 of air quality analysis device 105 may measure and/or detect infrared radiation in a surrounding environment of air quality analysis device 105. All sensors discussed herein may be part of sensors $172_{1-Q}$ discussed above.

Outputs 610 may be in the form of electrical signals used to identify air components of breathable air 103/air sample 178. The electrical signals may be generated by sensors $172_{1-Q}$ including the sensors discussed herein. An input 612 may be an intake of breathable air 103/air sample 178 (e.g., through a hose) from compressed air source 108/another compressed air source 109/air storage system 106.

An electromechanical gas sensor 616 of air quality analysis device 105 may be operated based on a diffusion of a gas of interest (e.g., air components of breathable air 103/air sample 178) thereinto. Said diffusion may result in generation of an electrical signal proportional to a concentration of the gas of interest. A dew point sensor 618 of air quality analysis device 105 may be used to measure and/or monitor a dew point temperature of breathable air 103/air sample 178. An audio alarm 620 may be a transducer device to emit an audible alert once an emergency state is detected by sensors $172_{1-Q}$. A power input 622 may be an input corresponding to an amount of energy put into and/or consumed by air quality analysis device 105. Connectors 624 may be links between electrical components of air quality analysis device 105.

An alarm relay 626 may be an electric switch that activates bypass controller device 140 when anomalies (e.g., contamination in breathable air 103) and/or faults (e.g., fire hazards, pressure variations, deviation in predefined air/air quality parameters, etc.) are detected by sensors $172_{1-Q}$, following which bypass controller device 140 may enable automatic bypassing of air storage system 106/compressed air source 108/another compressed air source 109 as discussed above. In one or more embodiments, air monitoring system 150 may be made of fire-rated material to protect safety system 100 from physical damage during hazardous situations. Further, in one or more embodiments, air monitoring system 150 may be made of weather-resistant and/or UV/solar/infrared radiation-resistant material/material(s) to prevent corrosion and/or deterioration of components thereof due to prolonged exposure to harsh environmental and/or weather conditions.

Figure 7:
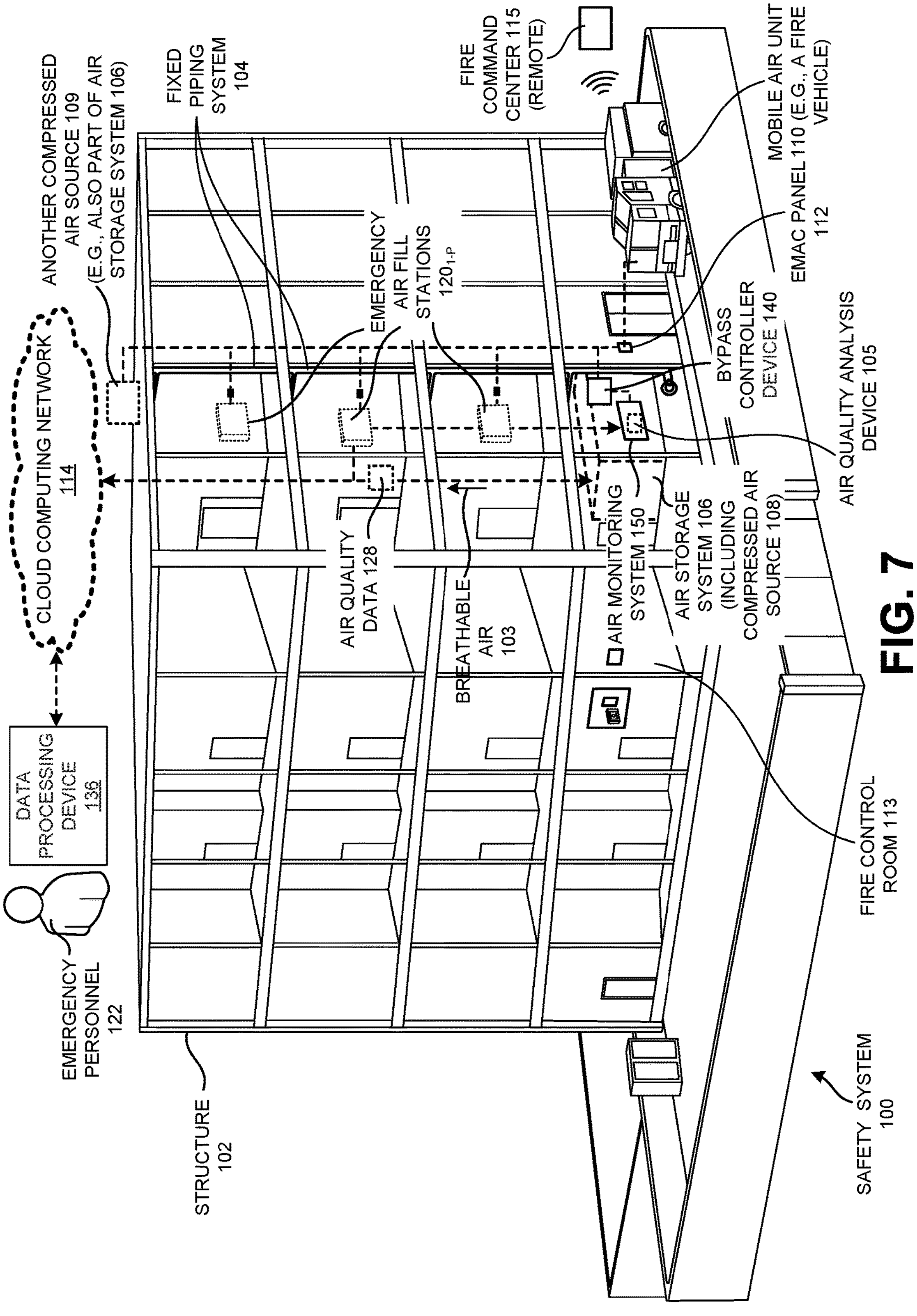
FIG. 7 is a schematic and an illustrative view of the safety system of FIGS. 1A-B implemented in a horizontal configuration of the structure thereof and communication therewithin, according to one or more embodiments.
Figure 8:
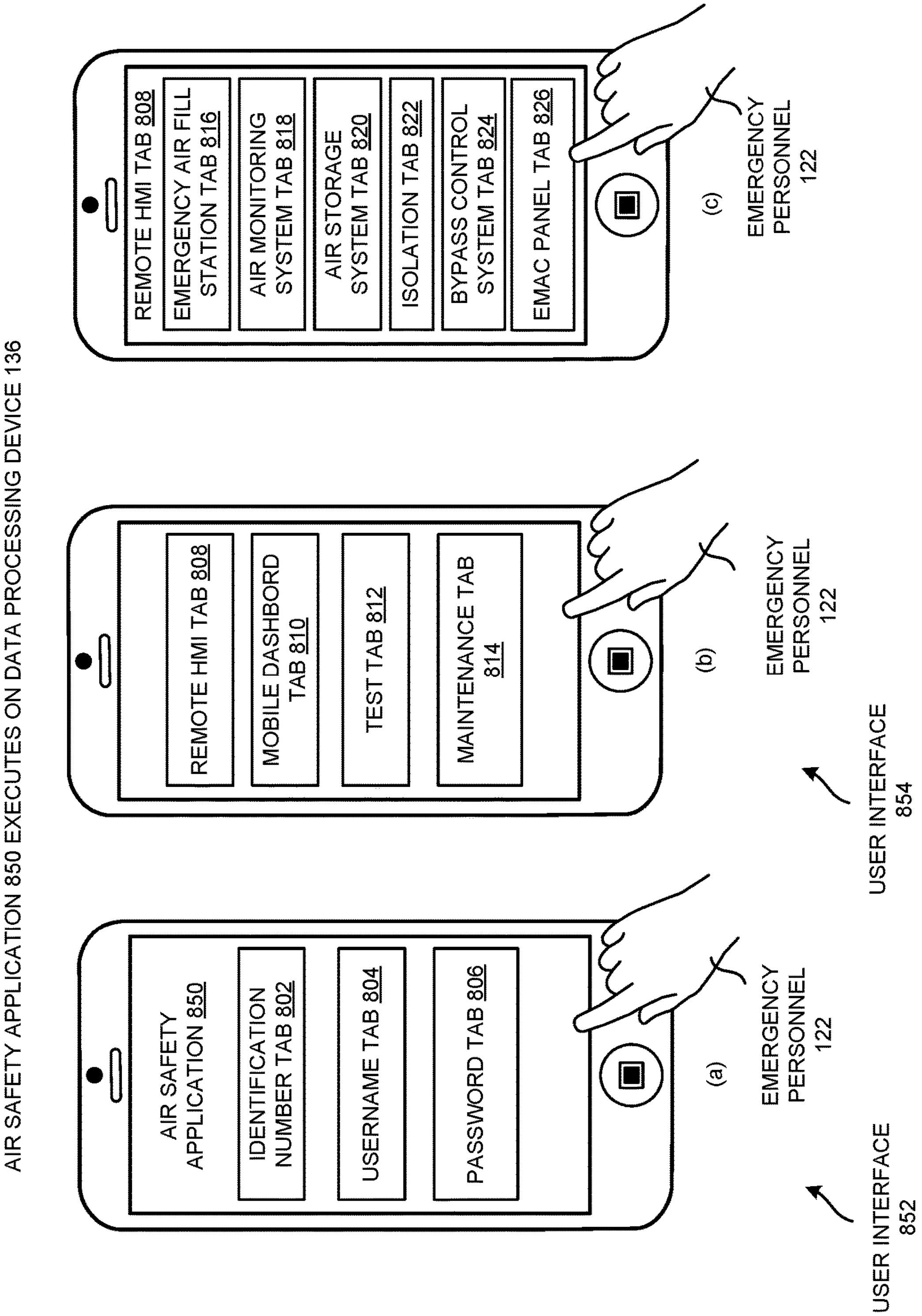
FIG. 8 is an example user interface view of an air safety application executing on a data processing device of FIG. 1B and FIG. 7.

FIG. 7 shows safety system 100 implemented in a horizontal configuration of structure 102 and communication therewithin, according to one or more embodiments. All concepts discussed in this Application may also be applicable to FIG. 7. FIG. 8 shows an example user interface 852 of an air safety application 850 executing on data processing device 136 (e.g., on a processor communicatively coupled to a memory thereof). As shown in '(a)', user interface 852 may display user authentication tabs of air safety application 850. Example user authentication tabs may include an identification number tab 802, a username tab 804, and a password tab 806. Emergency personnel 122 (e.g., authorized users, firefighters, emergency responses.) may need to enter a corresponding identification number, username and password to access features provided through air safety application 850.

As shown in '(b)', upon authentication, example user interface 854 may display a remote Human-Machine Interface (HMI) tab 808, a mobile dashboard tab 810, a test tab 812, and a maintenance tab 814. Remote HMI tab 808 may help emergency personnel 122 to remotely control safety system 100. Mobile dashboard tab 810 may help show a real-time graphical display of an entirety of safety system 100. Test tab 812 may help emergency personnel 122 to request analysis of breathable air 103 through remote certification laboratory 118 and generate custom reports. Maintenance tab 814 may help provide a proactive dimension to view upcoming and/or current maintenance requirements of safety system 100.

As shown in '(c)', remote HMI tab 808 may display an emergency air fill station tab 816, an air monitoring system tab 818, an air storage system tab 820, an isolation tab 822, a bypass control system tab 824, and an EMAC panel tab 826. Remote HMI tab 808 may enable emergency personnel 122 to control components associated with the aforementioned tabs to effect automatic bypass of air storage system 106/compressed air source 108/another compressed air source 109, as discussed above, and obtain air quality parameters 190. Based on zeroing in on specific tabs discussed herein, more detailed operations such as controlling relay devices, requesting certification through remote certification laboratory 118, purging breathable air 103 from safety system 100, isolating compressed air source 108/another compressed air source 109/air storage system 106 and so on are within the scope of the exemplary embodiments discussed herein.

In one or more embodiments, based on detection of emergency state(s) of safety system 100 and/or anomalous air quality parameters 190 through sensors $\mathbf{172}_{1\text{-}Q}$ via data processing device 136, fire command center 115 and/or fire control room 113, emergency personnel 122 may be able to purge safety system 100 of contaminated/bad/anomalous breathable air 103 prior to switching from one compressed air source (e.g., compressed air source 108) to another compressed air source (e.g., another compressed air source 109). In some other embodiments, leakage (e.g., detected through leakage sensor 326) of breathable air 103 may require plugging in of leak(s) in components of safety system 100 and/or fixing said components prior to reuse of the same compressed air source (e.g., air storage system 106, compressed air source 108, another compressed air source 109). The aforementioned tasks are instantaneously notified to emergency personnel 122 in accordance with one or more implementations of safety system 100 discussed herein. All reasonable variations are within the scope of the exemplary embodiments discussed herein.

Figure 9:
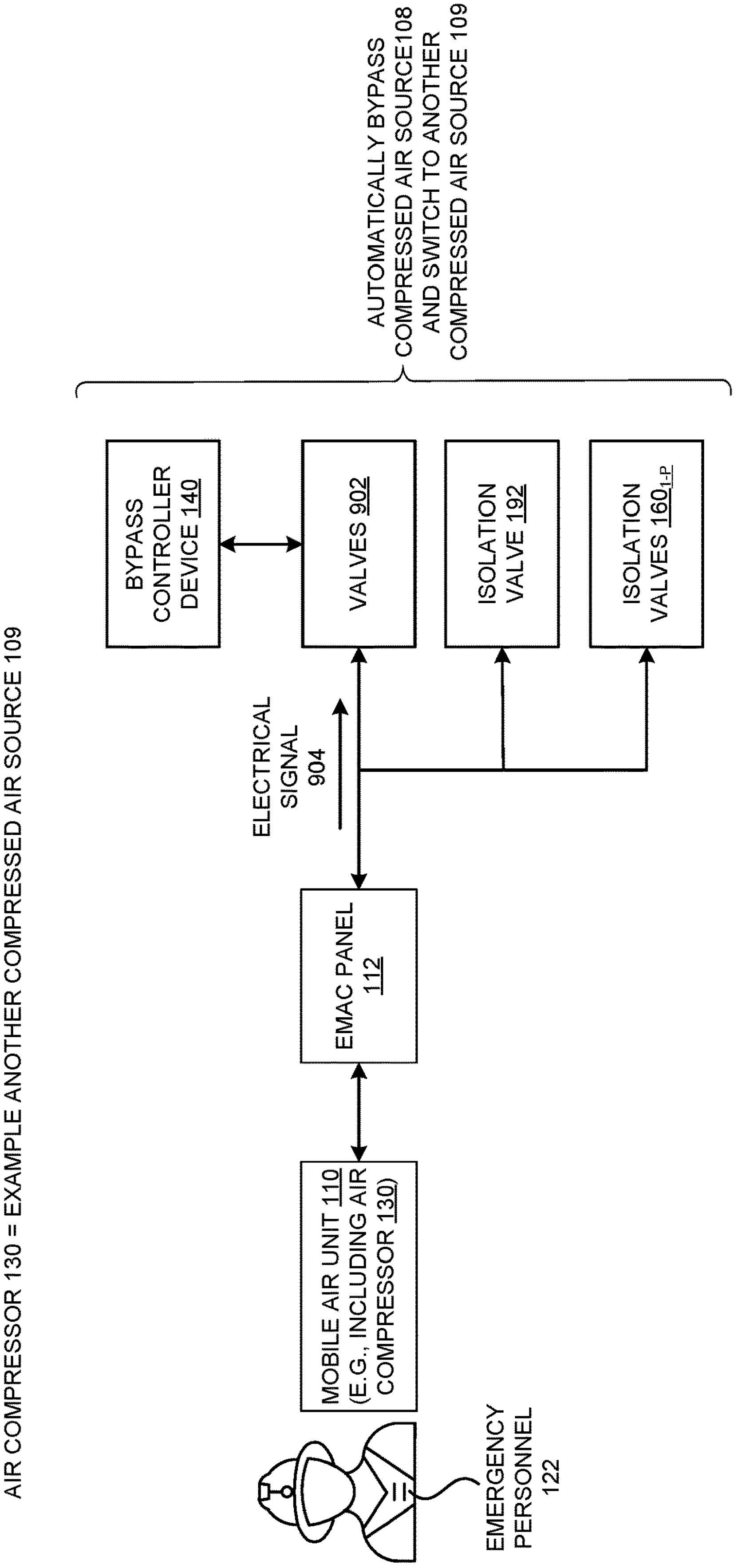
FIG. 9 is a schematic view of control of valves remotely from an External Mobile Air Connection (EMAC) panel of the safety system of FIG. 1B and FIG. 7, according to one or more embodiments.

It should be noted that, in one or more embodiments, in the case of another compressed air source 109 being mobile air unit 110 with air compressor 130, bypass controller device 140 may be implemented with one or more check valves and/or one or more automatic actuator selector valves remotely operable from EMAC panel 112 readily accessible by emergency personnel 122. FIG. 9 shows control of valves 902 (e.g., check valves, automatic actuator selector valves) implemented in conjunction with bypass controller device 140/isolation valve 192/isolation valves $\mathbf{160}_{1\text{-}P}$ remotely from EMAC panel 112 by emergency personnel 122, according to one or more embodiments. In one or more embodiments, in response to an electrical signal 904 from EMAC panel 112 (e.g., following detection of anomalies/faults in air quality parameters 190), valves 902/isolation valve 192/isolation valves $\mathbf{160}_{1\text{-}P}$ may be controlled to enable automatic bypass/isolation of compressed air source 108 with respect to breathable air 103 within safety system 100 and automatic switching to another compressed air source 109 (e.g., air compressor 130 on mobile air unit 110) to ensure direct and continued supply of breathable air 103 from another compressed air source 109 within safety system 100. In the case of control of isolation valve 192/isolation valves $\mathbf{160}_{1\text{-}P}$ through electrical signal 904, isolation valve 192 and/or isolation valves $\mathbf{160}_{1\text{-}P}$ may also be implemented with check valves and/or automatic actuator selector valves. All reasonable variations are within the scope of the exemplary embodiments discussed herein.

Figure 10:
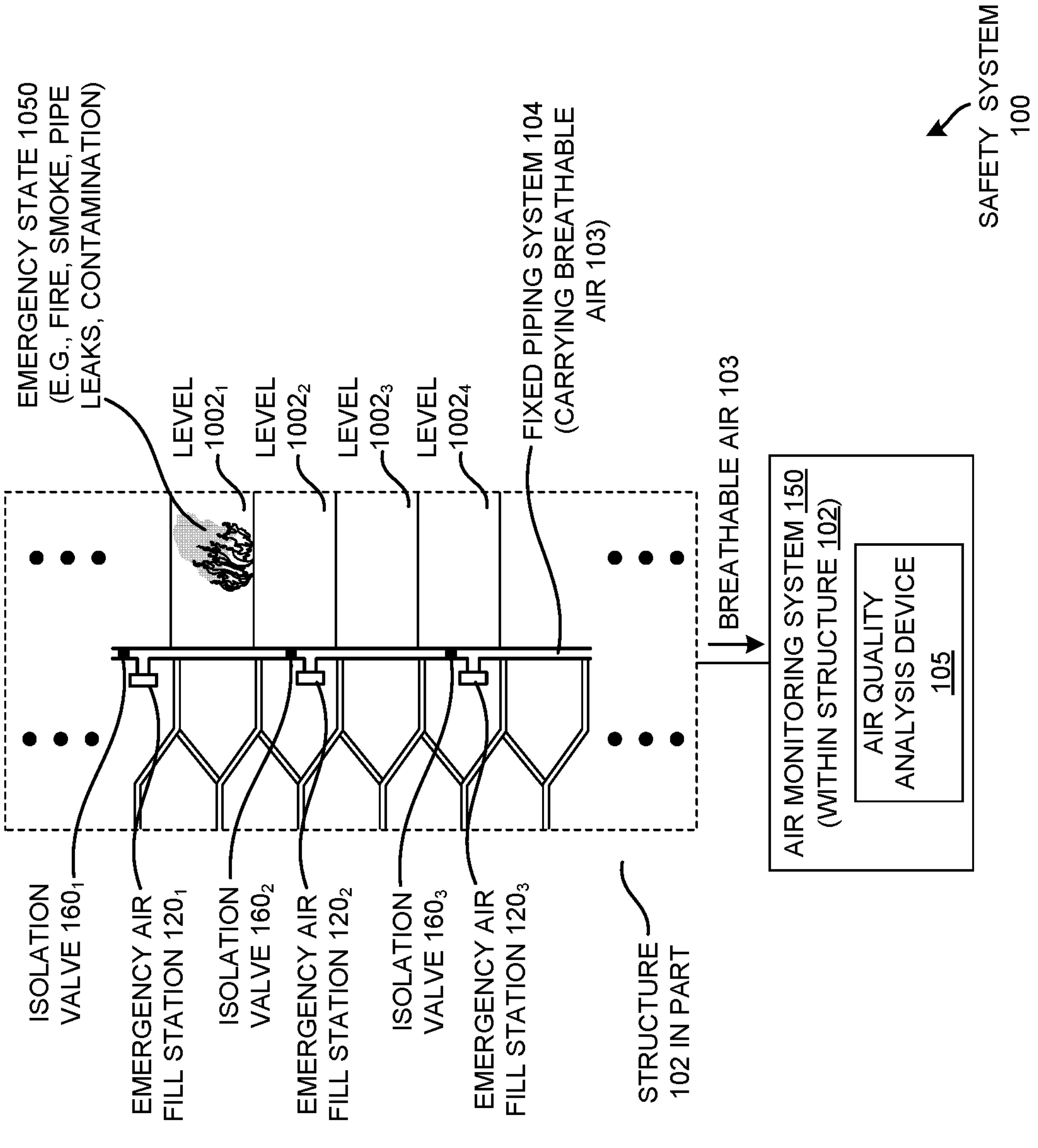
FIG. 10 is a schematic and an illustrative view of a portion of the structure and the safety system of FIGS. 1A-B including one or more levels in which an emergency state occurs, according to one or more embodiments.

FIG. 10 shows a portion of structure 102 including one or more levels (e.g., levels $\mathbf{1002}_{1\text{-}4}$) in which an emergency state 1050 occurs, according to one or more embodiments. In one or more embodiments, emergency state 1050 may include but is not limited to a fire, smoky condition(s), leakage of piping elements of fixed piping system 104 in the one or more levels and contamination of breathable air 103 in said piping elements. In some embodiments, levels $\mathbf{1002}_{1\text{-}4}$ may be floor levels within structure 102. For example, level $\mathbf{1002}_1$ may be a sixth floor level of structure 102, level $\mathbf{1002}_2$ may be a fifth floor level of structure 102, level $\mathbf{1002}_3$ may be a fourth floor level of structure 102 and level $\mathbf{1002}_4$ may be a third floor level of structure 102. FIG. 10 also illustrates a fire in level $\mathbf{1002}_1$ as an example emergency state 1050, although other conditions such as smoke, piping element leaks, piping element cracks and breathable air 103 contamination may also constitute emergency state 1050.

As discussed above, in one or more embodiments, emergency air fill station $\mathbf{120}_{1\text{-}P}$ may be a static location of access of breathable air 103 by emergency personnel 122 to fill air bottles thereof. In one or more embodiments, each level (e.g., floor level such as a level $\mathbf{1002}_{1\text{-}4}$) of structure 102 may have an emergency air fill station $\mathbf{120}_{1\text{-}P}$ therein. In some other embodiments, a level of structure 102 may have multiple emergency air fill stations $\mathbf{120}_{1\text{-}P}$ thereon. In still some other embodiments, an emergency air fill station $\mathbf{120}_{1\text{-}P}$ may cover more than one level of structure 102. Thus, to generalize, in one or more embodiments, an emergency air fill station $\mathbf{120}_{1\text{-}P}$ of structure 102 may be associated with or cover one or more levels (e.g., levels $\mathbf{1002}_{1\text{-}4}$) therewithin. FIG. 10 also shows an isolation valve $\mathbf{160}_{1\text{-}3}$ associated with or proximate each emergency air fill station $\mathbf{120}_{1\text{-}3}$. In FIG. 10, emergency air fill station $\mathbf{120}_1$/isolation valve $160_1$ may be associated with (or provide access to breathable air 103 at) level $1002_1$ and/or one or more other levels, emergency air fill station $120_2$/isolation valve $160_2$ may be associated with (or provide access to breathable air 103 at) level $1002_1$, level $1002_2$ and/or level $1002_3$, and emergency air fill station $120_3$/isolation valve $160_3$ may be associated with (or provide access to breathable air 103 at) level $1002_3$, level $1002_4$ and/or one or more other levels.

In one or more embodiments, as seen above, breathable air 103 through safety system 100 including breathable air 103 accessible through emergency air fill stations $120_{1-3}$ may also be received at air monitoring system 150 including air quality analysis device 105 for capturing air quality parameters 190/air quality data 128. In some embodiments, air monitoring system 150 including air quality analysis device 105 may be at multiple locations of structure 102 including one or more of levels $1002_{1-4}$. Similarly, bypass controller device 140 may also be at multiple locations of structure 102 including levels $1002_{1-4}$.

Figure 11:
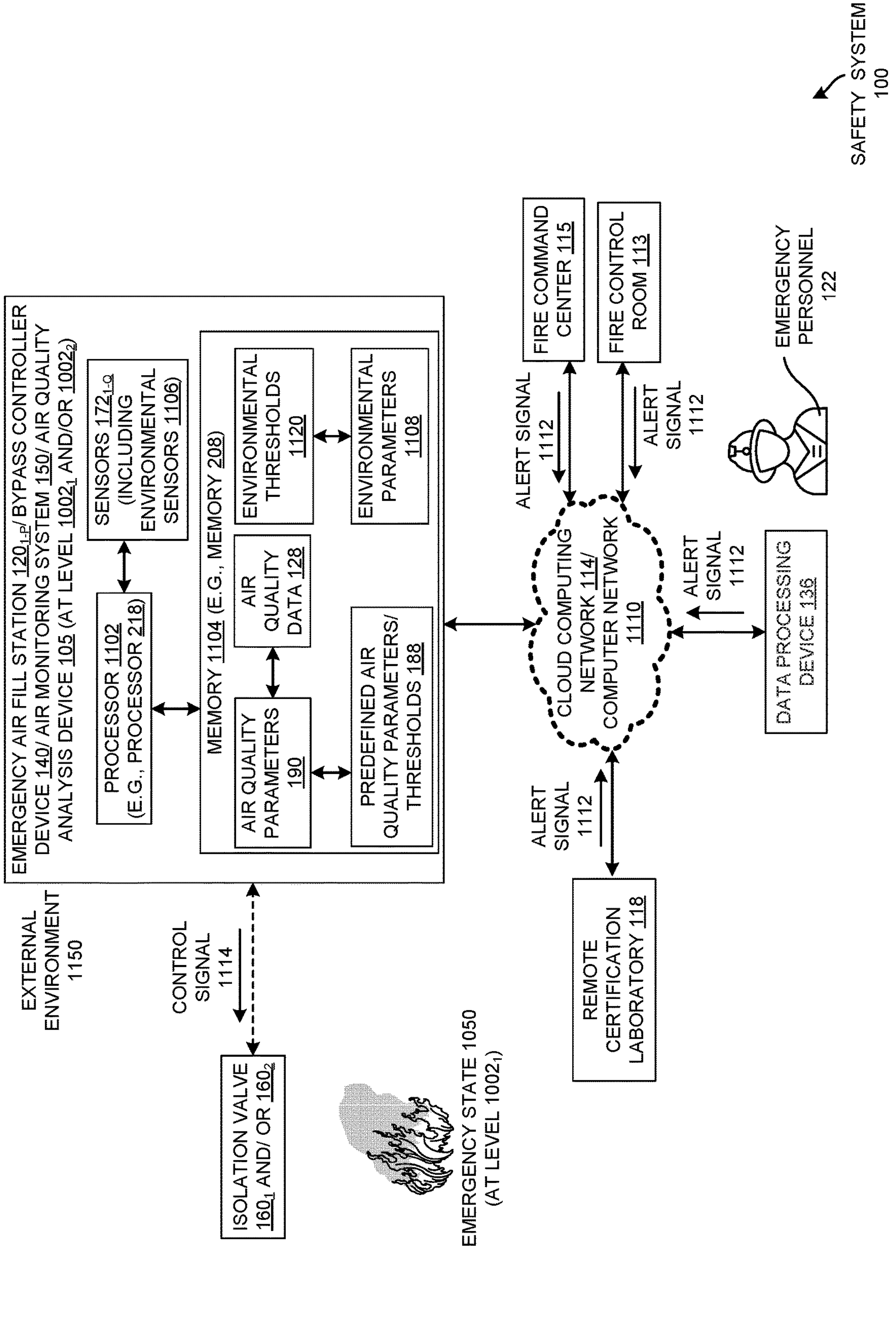
FIG. 11 is a schematic view of an emergency air fill station, a bypass controller device, an air monitoring system and/or an air quality analysis device of the safety system of FIGS. 1A-B with environmental sensors, according to one or more embodiments.

FIG. 11 shows an emergency air fill station $120_{1-P}$/bypass controller device 140/air monitoring system 150/air quality analysis device 105 with environmental sensors 1106, according to one or more embodiments. As discussed above, in one or more embodiments, sensors $172_{1-Q}$ of air quality analysis device 105 of air monitoring system 150 may sense air quality parameters 190. However, in conjunction therewith, in one or more embodiments, emergency air fill station $120_{1-P}$, bypass controller device 140 and/or air monitoring system 150/air quality analysis device 105 may have environmental sensors 1106 therein (or associated therewith) to sense parameters (e.g., environmental parameters 1108) of an external environment 1150 in a vicinity of emergency air fill station $120_{1-P}$. As shown in FIG. 11, environmental sensors 1106 may be regarded as part of sensors $172_{1-Q}$ for the sake of convenience.

In one or more embodiments, environmental sensors 1106 may include but are not limited to heat sensors, smoke sensors, leakage sensors (to sense leakage of breathable air 103 out of piping elements of fixed piping system 104 at one or more levels $1002_{1-4}$) and light sensors. Accordingly, in one or more embodiments, environmental parameters 1108 sensed by environmental sensors 1106 may include but are not limited to temperature/heat levels, smoke levels, leakage levels and light levels. FIG. 11 shows emergency air fill station $120_{1-P}$/bypass controller device 140/air monitoring system 150/air quality analysis device 105 having a processor 1102 (e.g., a microprocessor, a microcontroller, a standalone processor; e.g., processor 218 in the case of air quality analysis device 105) communicatively coupled to a memory 1104 (e.g., a volatile and/or a non-volatile memory; e.g., memory 208 in the case of air quality analysis device 105), according to one or more embodiments. In one or more embodiments, sensors $172_{1-Q}$ including environmental sensors 1106 may be interfaced with processor 218.

In one or more embodiments, environmental sensors 1106 may sense environmental parameters 1108 continuously (e.g., in real-time). As shown in FIG. 11, memory 1104 may include air quality parameters 190, air quality data 128, predefined air quality parameters/thresholds 188 and environmental parameters 1108, according to one or more embodiments. During emergency state 1050 at level $1002_1$, for example, one or more environmental sensors 1106 of emergency air fill station $120_{1-P}$/bypass controller device 140/air monitoring system 150/air quality analysis device 105 at level $1002_1$ and/or level $1002_2$ (in the case of emergency air fill station $120_{1-P}$, specifically, emergency air fill station $120_1$ and/or $120_2$) may detect, in conjunction with processor 1102 thereof, that one or more environmental parameters 1108 of external environment 1150 is outside (e.g., above) one or more environmental thresholds 1120 (e.g., predefined/predetermined levels/ranges). For example, a temperature/heat level of external environment 1150 may be outside a predetermined threshold level thereof in the case of a fire as emergency state 1050, a smoke level of external environment 1150 may be outside another predetermined threshold level in the case of smoke pollution as emergency state 1050, and a leakage level of breathable air 103 in external environment 1150 may be outside yet another predetermined threshold level in the case of leakage of breathable air 103 in level $1002_1$ as emergency state 1050.

Further, in one or more embodiments, one or more sensors $172_{1-Q}$ may sense one or more air quality parameters 190 and, in conjunction with processor 218, may determine that the one or more sensed air quality parameters 190 is above one or more predefined air quality parameters/thresholds 188 in the case of contamination of breathable air 103 or anomalous levels of one or more components of breathable air 103 within piping elements of fixed piping system 104 at level $1002_1$ constituting emergency state 1050. In one or more embodiments, the aforementioned sensing through sensors $172_{1Q}$ including environmental sensors 1106 may be performed in conjunction with processor 1102, which may receive data from and/or control sensors $172_{1-Q}$ through appropriate instructions executing thereon.

In one or more embodiments, in response to one or more sensors $172_{1-Q}$/environmental sensors 1106 sensing air quality parameters 190/environmental parameters 1108 and determining, in conjunction with processor 1102 (e.g., processor 218), that the one or more air quality parameters 190/environmental parameters 1108 in one or more levels (e.g., level $1002_1$) of structure 102 is outside a corresponding one or more predefined air quality parameters/thresholds 188/environmental thresholds 1120, processor 1102 of emergency air fill station $120_{1-P}$/bypass controller device 140/air monitoring system 150/air quality analysis device 105 at the same or another one or more levels (e.g., level $1002_1$ and/or level $1002_2$) may transmit a control signal 1114 to automatically close one or more isolation valves (e.g., isolation valve $160_1$ and/or isolation valve $160_2$) associated with the same or the another one or more levels to isolate breathable air 103 supplied to the one or more levels (e.g., level $1002_1$). In one or more embodiments, isolation valves $160_{1-P}$ may thus be electrically and/or electronically operable and/or controllable.

In one or more other embodiments, remote certification laboratory 118, data processing device 136 associated with emergency personnel 122, fire control room 113 and/or fire command center 115 may, based on communication with processor 1102 of emergency air fill station $120_{1-P}$/bypass controller device 140/air monitoring system 150/air quality analysis device 105 via a computer network 1110 (e.g., a Wide Area Network (WAN), a Local Area Network (LAN) and/or a short-range communication network) and/or cloud computing network 114, transmit an alert signal 1112 (e.g., analogous to alert signal 194) to processor 1102 of emergency air fill station $120_{1-P}$/bypass controller device 140/air monitoring system 150/air quality analysis device 105 to trigger the transmission of control signal 1114 to automatically close the one or more isolation valves discussed above upon the determination that the one or more air quality parameters 190/environmental parameters 1108 is outside the corresponding one or more predefined air quality parameters/thresholds 188/environmental thresholds 1120.

Exemplary embodiments discussed herein are not limited to isolation valves $160_{1-P}$ being closed to isolate breathable air 103 supplied to the one or more level(s) of structure 102 discussed above. Other kinds of valves/valve implementations and automatic closure thereof are within the scope of the exemplary embodiments discussed herein. In one or more embodiments, the isolation of breathable air 103 supplied to the one or more level(s) may prevent breathable air 103 supplied to the other level(s) from being contaminated and/or ensure that non-firefighting/rescuing emergency personnel 122 do not access (e.g., based on updates thereto through data processing device 136 via cloud computing network 114/computer network 1110) the one or more level(s). In one or more embodiments, the one or more emergency air fill station(s) $120_{1-P}$ corresponding to the automatically closed one or more isolation valve(s) $160_{1-P}$ may be automatically cut off from the supply of breathable air 103 from air storage system 106/compressed air source 108/another compressed air source 109. Further, in one or more embodiments, the isolation of breathable air 103 supplied to the one or more level(s) may facilitate the automatic bypass of air storage system 106/compressed air source 108/another compressed air source 109 in the case of emergency state 1050 being detected at most or all levels of structure 102. This, in one or more embodiments, may, in turn, facilitate the automatic purging of the isolated breathable air 103. All reasonable variations are within the scope of the exemplary embodiments discussed herein.

Figure 12:
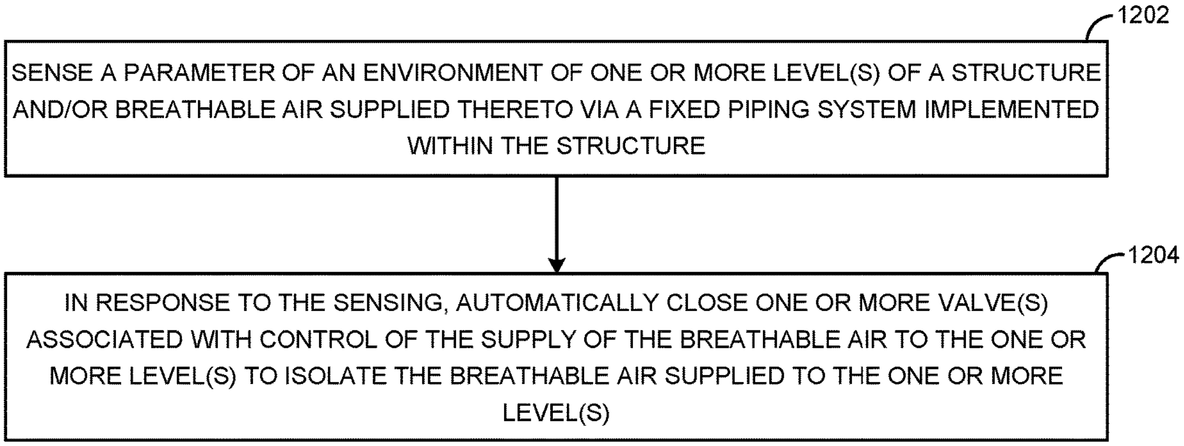
FIG. 12 is a process flow diagram detailing the operations involved in air/environmental parameter based automatic closing of one or more valves to isolate breathable air supplied to one or more levels of a structure having a safety system implemented therein, according to one or more embodiments.

FIG. 12 shows a process flow diagram detailing the operations involved in air/environmental parameter based automatic closing of one or more valve(s) (e.g., isolation valves $160_1$ and/or $160_2$) to isolate breathable air (e.g., breathable air 103) supplied to one or more level(s) (e.g., level $1002_1$) of a structure (e.g., structure 102) having a safety system (e.g., safety system 100) implemented therein, according to one or more embodiments. In one or more embodiments, the breathable air may be supplied across the safety system including a number of levels (e.g., levels $1002_{1-4}$) thereof through a fixed piping system (e.g., fixed piping system 104) implemented therein. In one or more embodiments, operation 1202 may involve sensing (e.g., through sensors $172_{1-Q}$ including environmental sensors 1106) a parameter (e.g., part of air quality parameters 190, environmental parameters 1108) of an environment (e.g., external environment 1150) of the one or more level(s) of the number of levels of the structure and/or the breathable air supplied thereto. In one or more embodiments, operation 1204 may then involve, in response to the sensing, automatically closing (e.g., through processor 1102) the one or more valve(s) associated with control of the supply of the breathable air to the one or more level(s) to isolate the breathable air supplied to the one or more level(s).

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having a plurality of levels and a fixed piping system installed therewithin to supply breathable air from a source across the safety system including the plurality of levels, comprising:

sensing a parameter of an environment of a level of the plurality of levels of the structure and a parameter of the breathable air supplied to the level;

determining that the parameter of the environment of the level is outside of a threshold value for the environment or that the parameter of the breathable air supplied to the level is outside of a threshold value for the breathable air; and in response to the parameter of the environment of the level being outside of the threshold value for the environment or the parameter of the breathable air supplied to the level being outside of the threshold value for the breathable air, automatically closing a valve associated with control of the source of the breathable air to the level to isolate the breathable air supplied to the level from the breathable air supplied to one or more other levels of the plurality of levels within the structure.

2. The method of claim 1, further comprising at least one of:

sensing the parameter of the breathable air using a sensor associated with an air analysis device coupled to an air flow path of the breathable air from the source within the safety system;

sensing the parameter of the environment of the level using an environmental sensor associated with at least one of: at least one emergency air fill station providing access to the breathable air at the level, a bypass controller device and the air analysis device; and automatically closing the valve in accordance with a control signal transmitted thereto from a processor associated with the at least one of: the at least one emergency air fill station, the bypass controller device and the air analysis device.

3. The method of claim 2, comprising the sensor associated with the air analysis device comprising at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

4. The method of claim 1, further comprising automatically cutting off at least one emergency air fill station corresponding to the automatically closed valve from the source of the breathable air.

5. The method of claim 1, comprising the parameter of the breathable air supplied to the level comprising at least one of: an air quality parameter and an air component parameter.

6. The method of claim 1, comprising the plurality of levels of the structure being a plurality of floor levels thereof.

7. A method of a safety system of a structure having a plurality of levels and a fixed piping system installed therewithin to supply breathable air from a source across the safety system including the plurality of levels, comprising:
- sensing a parameter of an environment of a level of the plurality of levels of the structure and a parameter of the breathable air supplied to the level;
- determining that the parameter of the environment of the level is outside of a threshold value for the environment or that the parameter of the breathable air supplied to the level is outside of a threshold value for the breathable air; and
- in response to determining that the parameter of the environment of the level is outside of the threshold value for the environment or the parameter of the breathable air supplied to the level is outside of the threshold value for the breathable air, automatically closing a valve associated with control of the source of the breathable air to the level to isolate the breathable air supplied to the level from the breathable air supplied to one or more other levels of the plurality of levels within the structure.

8. The method of claim 7, further comprising at least one of:
- sensing the parameter of the breathable air using a sensor associated with an air analysis device coupled to an air flow path of the breathable air from the source within the safety system;
- sensing the parameter of the environment of the level using an environmental sensor associated with at least one of: at least one emergency air fill station providing access to the breathable air at the level, a bypass controller device and the air analysis device; and
- automatically closing the valve in accordance with a control signal transmitted thereto from a processor associated with the at least one of: the at least one emergency air fill station, the bypass controller device and the air analysis device.

9. The method of claim 8, comprising the sensor associated with the air analysis device comprising at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

10. The method of claim 7, further comprising automatically cutting off at least one emergency air fill station corresponding to the automatically closed valve from the source of the breathable air.

11. The method of claim 7, comprising the parameter of the breathable air supplied to the level comprising at least one of: an air quality parameter and an air component parameter.

12. The method of claim 7, comprising the plurality of levels of the structure being a plurality of floor levels thereof.

13. A safety system of a structure having a plurality of levels, comprising:
- a source of breathable air;
- a fixed piping system installed within the structure for supply of the breathable air from the source across the safety system including the plurality of levels; and
- at least one component comprising sensors associated therewith, the sensors including (i) an environmental sensor configured to sense a parameter of an environment of a level of the plurality of levels and (ii) a breathable air sensor configured to sense a parameter of the breathable air supplied to the level, the at least one component configured to:
  - determine that the parameter of the environment of the level is outside of a threshold value for the environment or that the parameter of the breathable air supplied to the level is outside of a threshold value for the breathable air; and
  - in response to the parameter of the environment of the level being outside of the threshold value for the environment or the parameter of the breathable air supplied to the level being outside of the threshold value for the breathable air, automatically close a valve associated with control of the source of the breathable air to the level to isolate the breathable air supplied to the level from the breathable air supplied to one or more other levels of the plurality of levels within the structure.

14. The safety system of claim 13, wherein at least one of:
- the at least one component comprises an air analysis device coupled to an air flow path of the breathable air from the source within the safety system, the air analysis device having the breathable air sensor associated therewith to sense the parameter of the breathable air,
- the at least one component comprises the environmental sensor associated therewith to sense the parameter of the environment of the level, the at least one component being at least one of: at least one emergency air fill station providing access to the breathable air at the level, a bypass controller device and the air analysis device, and
- a processor associated with the at least one component transmits a control signal to the at least one valve to automatically close the valve.

15. The safety system of claim 14, wherein the breathable air sensor associated with the air analysis device comprises at least one of: a carbon monoxide sensor configured to sense a level of carbon monoxide in the breathable air, a carbon dioxide sensor configured to sense a level of carbon dioxide in the breathable air, an oxygen sensor configured to sense a level of oxygen in the breathable air, a nitrogen sensor configured to sense a level of nitrogen in the breathable air, a hydrocarbon sensor configured to sense a condensed hydrocarbon content in the breathable air, and a moisture sensor configured to sense a moisture concentration in the breathable air.

16. The safety system of claim 13, wherein at least one emergency air fill station corresponding to the automatically closed valve is automatically cut off from the source of the breathable air.

17. The safety system of claim 13, wherein the parameter of the breathable air supplied to the level comprises at least one of: an air quality parameter and an air component parameter.

18. The safety system of claim 13, wherein the plurality of levels of the structure is a plurality of floor levels thereof.

* * * * *